(12) United States Patent
Brewer et al.

(10) Patent No.: US 8,455,054 B2
(45) Date of Patent: Jun. 4, 2013

(54) AUTOMATED WING PAINTING SYSTEM

(75) Inventors: Kenneth R. Brewer, Arlington, WA (US); Jeffery P. Swanberg, Bonney Lake, WA (US); Carlos Aromin Ordona, Mukilteo, WA (US); Didier Rouaud, Auburn Hills, MI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/341,430

(22) Filed: Dec. 30, 2011
(Under 37 CFR 1.47)

(65) Prior Publication Data
US 2013/0071573 A1 Mar. 21, 2013

Related U.S. Application Data

(63) Continuation-in-part of application No. 12/403,956, filed on Mar. 13, 2009, now Pat. No. 8,088,450.

(51) Int. Cl.
*B05D 7/00* (2006.01)

(52) U.S. Cl.
USPC ...... 427/402; 427/421.1; 427/424; 427/427.2

(58) Field of Classification Search
USPC .................. 427/421.1, 424, 427.2
See application file for complete search history.

(56) References Cited

U.S. PATENT DOCUMENTS

| | | | |
|---|---|---|---|
| 2,733,172 A | 1/1956 | Brennan | |
| 4,041,898 A | 8/1977 | Tajima | |
| 4,974,532 A | 12/1990 | March | |
| 5,020,677 A | 6/1991 | Wirth et al. | |
| 5,248,341 A * | 9/1993 | Berry et al. | 118/698 |
| 5,858,111 A | 1/1999 | Marrero | |
| 5,979,001 A | 11/1999 | Marrero | |
| 6,134,734 A | 10/2000 | Marrero | |
| 6,477,730 B1 | 11/2002 | Marrero | |
| 7,140,555 B1 | 11/2006 | Bricko et al. | |
| 7,350,890 B2 | 4/2008 | Baird et al. | |
| 8,015,938 B2 | 9/2011 | Herre et al. | |
| 2005/0136191 A1 | 6/2005 | Vos et al. | |
| 2010/0233373 A1 | 9/2010 | Swanberg et al. | |

FOREIGN PATENT DOCUMENTS

| | | |
|---|---|---|
| DE | 692922C C | 6/1940 |
| GB | 249463 A | 7/1926 |
| WO | 03022532 A2 | 3/2009 |

OTHER PUBLICATIONS

USPTO Notice of Allowance dated Aug. 31, 2011 regarding U.S. Appl. No. 12/403,956 (8-1144) (7 pages).
PCT Search report dated Jun. 29, 2010 regarding International Application No. PCT/US2010/026855 (08-1144PCT)(5 pages).
PCT search report dated Mar. 6, 2013 regarding application PCT/US2012/067396, filed Nov. 30, 2012, reference 11-1387PCT, applicant The Boeing Company, 13 pages.

\* cited by examiner

*Primary Examiner* — Eisa Elhilo
(74) *Attorney, Agent, or Firm* — Yee & Associates, P.C.

(57) ABSTRACT

A method and apparatus for spraying a liquid onto a surface. An apparatus comprises a nozzle and a number of disks. The nozzle is configured to generate a spray of a liquid towards a surface. The number of disks is positioned relative to the nozzle and configured to form a gap through which a portion of the spray of the liquid passes towards the surface.

20 Claims, 20 Drawing Sheets

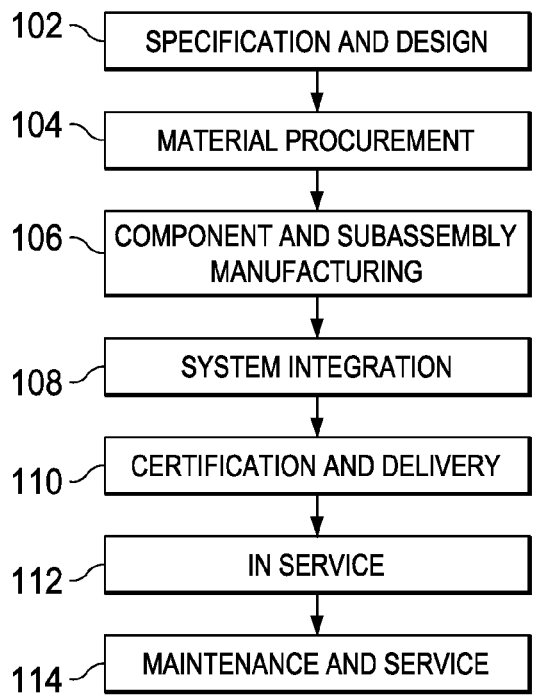
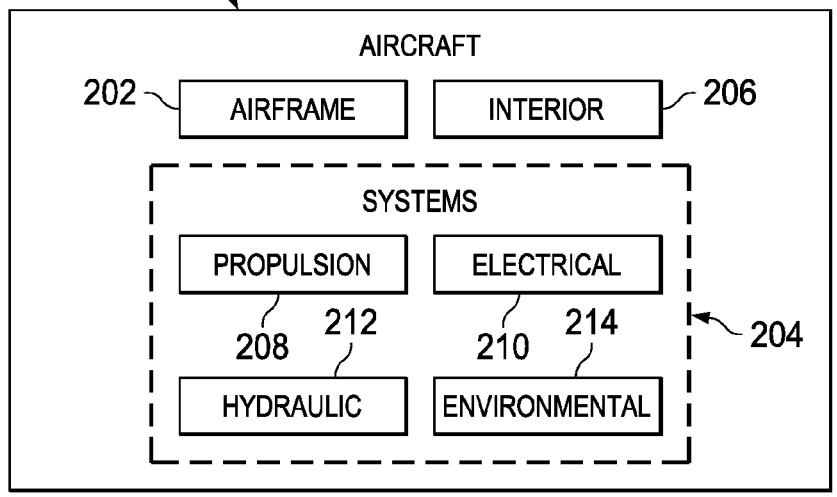

AUTOMATED WING PAINTING SYSTEM

CROSS-REFERENCE TO RELATED APPLICATION

This application is a continuation-in-part of patent application U.S. Ser. No. 12/403,956, filed Mar. 13, 2009, now U.S. Pat. No. 8,088,450 B2 entitled "Automated Wing Painting System", which is incorporated herein by reference.

BACKGROUND INFORMATION

1. Field

The present disclosure relates generally to manufacturing structures and, in particular, to a method and apparatus for painting structures. Still more particularly, the present disclosure relates to a method and apparatus for painting a wing for an aircraft.

2. Background

In manufacturing aircraft, machines, tools, human labor, materials, and/or other suitable items may be used to assemble structures. These structures may include, for example, without limitation, a wing, a fuselage, a rudder, or some other suitable structure.

Part of the manufacturing process includes finishing structures prior to assembly. For example, a wing of an aircraft may be painted prior to attaching the wing to a fuselage. The painting of a wing may occur for a number of different reasons. For example, the exterior of the wing may be painted to provide better airflow, for aesthetic reasons, to prevent corrosion, and/or for other purposes. The interior of a wing also may be painted. This painting may be used to reduce noise, prevent corrosion, increase inspectability, and/or for other suitable purposes.

As another example, in finishing a wing, other types of corrosion-resistant compounds may be applied to the wing in addition to paint. A waxy oil also may be applied to the wing. This waxy oil fills seams, crevices, and/or other small gaps. The waxy oil soaks into these features and prevents and/or reduces water from entering the wing from these features.

Currently, the manufacturing processes for finishing a wing may require changing the orientation and location of a wing during painting. In some cases, the size of the wing may require the wing to be painted and cleaned in several different booths and to be changed in orientation several times. During this process, the wing starts out in a horizontal orientation, moves to another booth into a vertical orientation, and moves to a third booth back into a horizontal orientation.

With this type of process, the wing is placed in a first paint booth in the horizontal orientation. In this position, portions of the wing, such as the front spar, the rear spar, and the leading edge canopy, are painted in the first booth.

Thereafter, the wing is removed from the first booth and placed into a vertical orientation in a second booth. A vertical position provides access, ergonomic benefits, and safety benefits. In this booth, operations, such as sanding, masking, and painting the sides of the wing, are performed. Further, various graphics, tail numbers, maintenance markings, and/or other suitable designs may be painted onto the wing.

The wing is then removed from the second booth and placed into a horizontal orientation in a third booth. In this booth, various materials for corrosion protection may be applied to fill in crevices and seams in the wing.

This type of process requires labor, time, space, and materials. For example, moving the wing from a horizontal orientation to a vertical orientation takes a number of hours. Further, the time needed to schedule a crane for a move and have the crane arrive also may take a number of hours. As a result, the process of scheduling a crane, having the crane and crane crew arrive, and moving the wing may take around eight hours.

Operations that also increase the time needed to finish a wing include the time needed to apply finishing compounds to the wing. For example, when lines, lettering, and other graphics are painted on top of a base coat or other layer of paint, time is needed to add these graphics. For example, time is needed to allow the base coat of paint to dry sufficiently to mask off areas for painting the graphics. After the base coat has dried, then operations are performed to place tape or other materials on the wing for painting the graphics. Thereafter, the graphics are painted on the wing, and the tape may be removed after sufficient curing time has passed such that the paint is semi-cured. These different operations also may take more time than desired during the process of painting a wing.

It would be desirable to have a method and apparatus that takes into account one or more of the issues discussed above, as well as possibly other issues.

SUMMARY

In one illustrative embodiment, an apparatus comprises a nozzle and a number of disks. The nozzle is configured to generate a spray of a liquid towards a surface. The number of disks is positioned relative to the nozzle and configured to form a gap through which a portion of the spray of the liquid passes towards the surface.

In another illustrative embodiment, a method for spraying a liquid onto a surface is present. A spray of the liquid is generated from a nozzle towards the surface. A portion of the spray of the liquid is sent towards the surface through a gap formed by a number of disks positioned relative to the nozzle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 1 is an illustration of an aircraft manufacturing and service method in accordance with an illustrative embodiment;

FIG. 2 is an illustration of an aircraft in which an illustrative embodiment may be implemented;

FIG. 3 is an illustration of a finishing environment in accordance with an illustrative embodiment;

FIG. 4 is an illustration of a robot in accordance with an illustrative embodiment;

FIG. 5 is an illustration of a data processing system in accordance with an illustrative embodiment;

FIG. 6 is an illustration of an automated finishing system in accordance with an illustrative embodiment;

FIG. 7 is an illustration of a side view of an automated finishing system in accordance with an illustrative embodiment;

DETAILED DESCRIPTION

Figure 3:
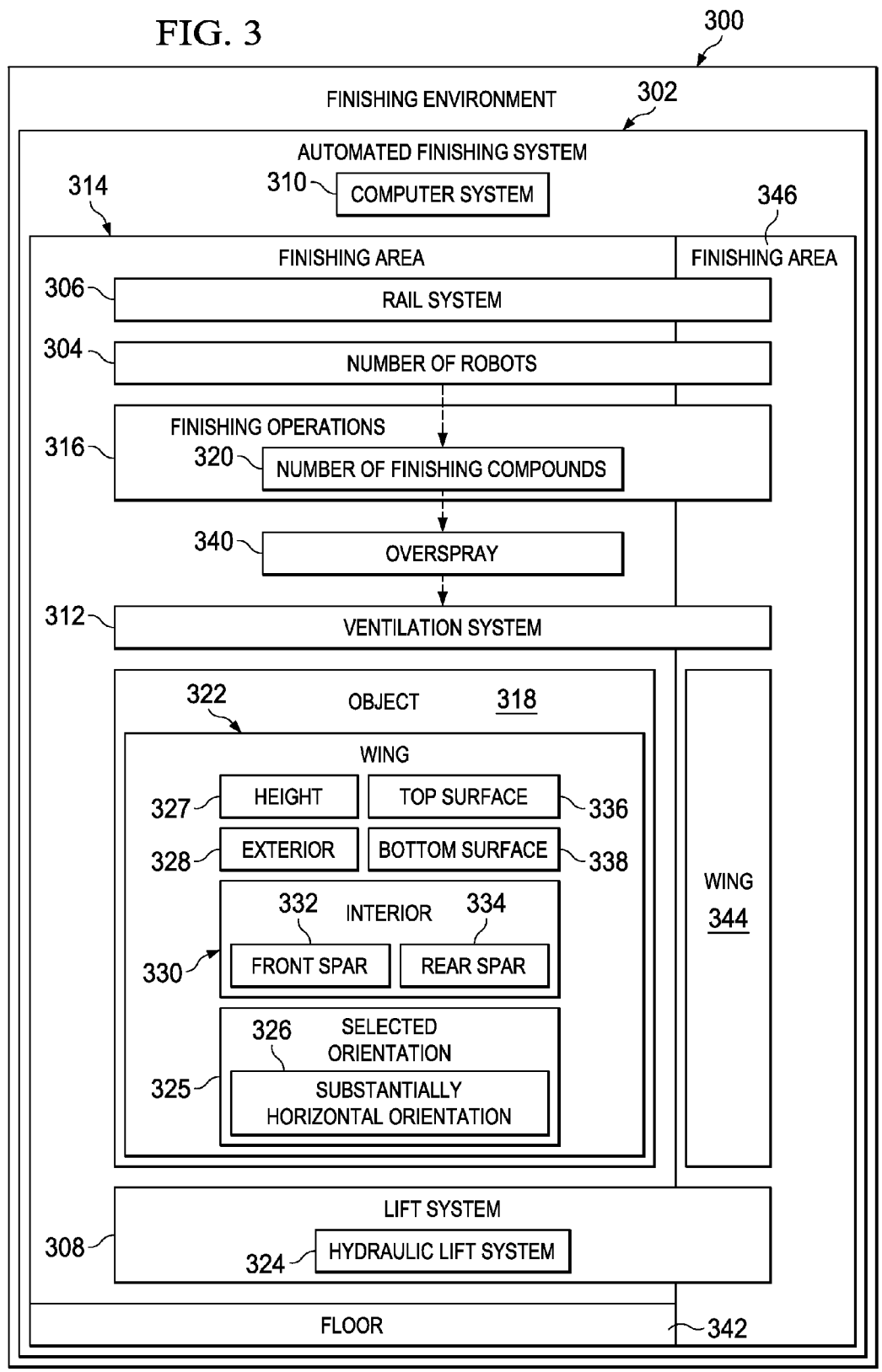

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatuses and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As a specific example, the different illustrative embodiments may be used to finish parts for aircraft 200 during component and subassembly manufacturing 106. For example, the different illustrative embodiments may be used to finish parts, such as wings, fuselages, rudders, and/or other suitable components for aircraft 200. Additionally, the different illustrative embodiments also may be employed during maintenance and service 114 to refinish wings, finish replacement wings, and perform other suitable finishing processes.

The different illustrative embodiments recognize and take into account a number of different factors and/or issues. For example, currently used manufacturing processes may require increased expense and time because of the repositioning of the wing. Further, the different illustrative embodiments also recognize that additional space may be required to reduce the amount of time needed to finish a wing.

Even with increasing the number of booths and with increased space, the different illustrative embodiments recognize and take into account that many of the operations performed to finish the wing in current finishing environments must be performed sequentially and cannot be combined. Further, the different illustrative embodiments recognize and take into account that many operations are repeated in the different orientations.

For example, operations may be repeated when the wing is painted and cleaned in three different booths and in three different positions. The different illustrative embodiments recognize and take into account that it would be desirable to combine operations rather than perform them in sequence with respect to finishing the aircraft.

Thus, the different illustrative embodiments provide a method and apparatus for finishing an aircraft. In the illustrative examples, an apparatus comprises a lift system and a number of robots. The lift system is capable of positioning an object in a selected orientation. The number of robots is capable of applying a number of finishing compounds to at least one of an interior of the object and an exterior of the object while the object remains in the selected orientation.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. A number, as used herein, when referring to an item, refers to one or more items. For example, a number of robots is one or more robots.

Turning now to FIG. 3, an illustration of a finishing environment is depicted in accordance with an illustrative embodiment. In this illustrative example, finishing environment 300 includes automated finishing system 302. Automated finishing system 302 may include number of robots 304, rail system 306, lift system 308, computer system 310, and ventilation system 312.

Number of robots 304, rail system 306, lift system 308, and ventilation system 312 may be located in finishing area 314. Finishing area 314 is a location in which finishing operations 316 are performed. Computer system 310 controls number of robots 304, lift system 308, and ventilation system 312 to perform finishing operations 316 in these illustrative examples.

Number of robots 304 may move around finishing area 314. In these illustrative examples, number of robots 304 move within finishing area 314 on rail system 306.

Number of robots 304 performs finishing operations 316 on object 318. In these illustrative examples, finishing operations 316 may include, for example, without limitation, applying number of finishing compounds 320 to object 318. Number of finishing compounds 320 may include, for example, without limitation, a top coat paint, a primer, a waxy oil, and/or some other suitable compound.

In these illustrative examples, a primer is a paint used to provide a primer layer for other paint coats or compounds. A top coat paint is a paint used to obtain the desired aesthetic look for object 318. The waxy oil is a finishing compound that is used to fill crevices and/or seams to keep water out of the interior of object 318.

Finishing operations 316 may also include, for example, without limitation, cleaning, sanding, masking, and/or other suitable operations needed to finish object 318.

In these illustrative examples, object 318 takes the form of wing 322. In these illustrative examples, lift system 308 takes the form of hydraulic lift system 324.

Hydraulic lift system 324 may position wing 322 in selected orientation 325. Selected orientation 325 may be with respect to a plurality of axes. For example, selected orientation 325 may be with respect to three axes in a three-dimensional space. In these illustrative examples, selected orientation 325 is in substantially horizontal orientation 326.

Hydraulic lift system 324 is capable of changing height 327 of wing 322 without changing selected orientation 325. In other words, height 327 of wing 322 may be changed without moving wing 322 out of substantially horizontal orientation 326. The change in height 327 may be performed during the performing of finishing operations 316. This change in height 327 of wing 322 allows number of robots 304 to reach different parts of wing 322.

For example, wing 322 has exterior 328 and interior 330. In interior 330, wing 322 includes components, such as front spar 332 and rear spar 334, on which number of finishing compounds 320 may be applied. Further, wing 322 also has top surface 336 and bottom surface 338.

Number of robots 304 may perform finishing operations 316 on exterior 328 and interior 330 of wing 322 simultaneously in some illustrative examples. The positioning of wing 322 by hydraulic lift system 324 may provide number of robots 304 a capability to reach these different parts of wing 322, while performing finishing operations 316.

In these illustrative examples, number of robots 304 may apply number of finishing compounds 320 in a manner that allows different finishing compounds within number of finishing compounds 320 to be blended. For example, one finishing compound may be applied at one thickness by a robot within number of robots 304, while another finishing compound within number of finishing compounds 320 may be applied by another robot within number of robots 304 at another thickness. A location at which these two finishing compounds meet may occur such that the thicknesses are blended. This type of blending may be performed by number of robots 304 in a manner without requiring masking.

While applying number of finishing compounds 320, number of robots 304 may generate overspray 340. Overspray 340 occurs when a portion of number of finishing compounds 320 does not contact and/or stick to wing 322 when applied by number of robots 304.

The different illustrative embodiments use ventilation system 312 to pull overspray 340 away from wing 322. In these illustrative examples, overspray 340 is pulled downward into floor 342 of finishing area 314 by ventilation system 312. Ventilation system 312 generates a flow of air capable of pulling overspray 340 away from wing 322 in these illustrative examples. Number of robots 304 generates overspray 340 at angles and/or directions that allow for ventilation system 312 to pull overspray 340 away from wing 322.

With these and other features, the different illustrative embodiments provide a capability to perform finishing operations 316 without changing the position of wing 322 to different orientations. In other words, movement of wing 322 from a horizontal position, to a vertical position, and back to a horizontal position may be avoided using automated finishing system 302.

Automated finishing system 302 allows for wing 322 to remain in the same position during performance of finishing operations 316. As a further feature provided by one or more of the different illustrative embodiments, automated finishing system 302 requires only one location or booth within finishing area 314 to perform finishing operations 316 on a second wing, such as wing 344.

Further, in some illustrative embodiments, finishing operations 316 may be performed on wing 344 using number of robots 304. With this type of embodiment, rail system 306 extends into finishing area 346 in which wing 344 is located.

Other components, such as hydraulic lift system 324 and ventilation system 312, also extend and/or are present within finishing area 346. With this type of implementation, number of robots 304 may perform finishing operations 316 on wing 344. Finishing operations 316 may be performed on wing 322 and wing 344 simultaneously or sequentially in a manner that reduces the amount of time needed to finish these parts.

The illustration of finishing environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, automated finishing system 302 may include another number of robots, another rail system, another ventilation system, and/or other suitable components to finish additional wings. Further, in other illustrative embodiments, rail system 306 may be unnecessary if number of robots 304 is mobile robots. In other words, number of robots 304 may have wheels, tracks, legs, and/or other suitable features needed to move without the use of rail system 306.

As another illustrative example, although finishing operations 316 may be performed by number of robots 304, some of finishing operations 316 may be performed using human operators. For example, plugging open holes and masking adjustment surfaces, fittings, bearings, and/or other suitable components may be performed by human operators instead of by number of robots 304.

In some illustrative embodiments, computer system 310 may be located in finishing area 314. In yet other illustrative embodiments, computer system 310 may be located remotely to finishing area 314 and may communicate with the other components through a network that may contain wires or wireless connections.

In yet other illustrative embodiments, lift system 308 may take other forms than hydraulic lift system 324. For example, lift system 308 may be an entirely mechanical lift system. Further, in these illustrative examples, finishing operations 316 have been described with wing 322 in a stationary location. In other illustrative embodiments, wing 322 may move in finishing area 314, while finishing operations 316 are performed on wing 322. With this type of implementation, wing 322 may be placed on a rail system and/or some other type of transport. Different types of operations within finishing operations 316 may be performed by number of robots 304, while finishing operations 316 are performed.

Figure 4:
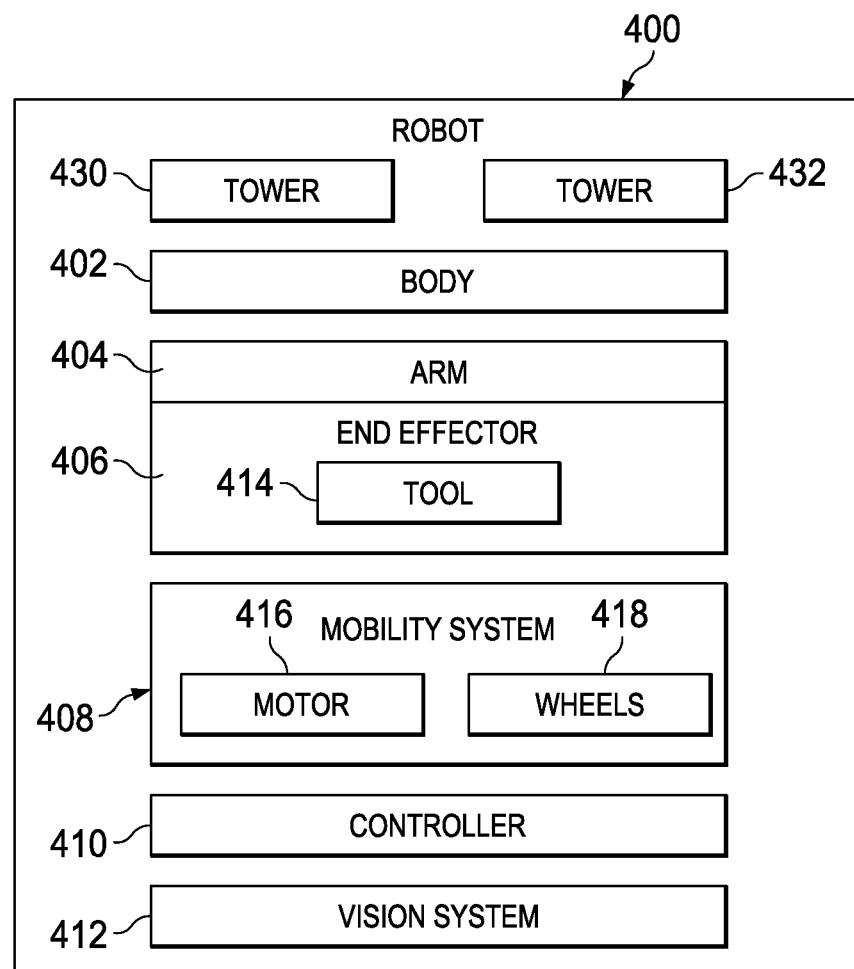

Turning now to FIG. 4, an illustration of a robot is depicted in accordance with an illustrative embodiment. In this example, robot 400 is an example of one manner in which number of robots 304 in FIG. 3 may be implemented.

In this illustrative example, robot 400 includes body 402, arm 404, end effector 406, mobility system 408, controller 410, vision system 412, and/or other suitable components.

Body 402 provides a structure and/or housing for which different components may be located on and/or in robot 400. In these examples, arm 404 is moveably attached to body 402 and has end effector 406. Arm 404 and/or end effector 406 may be moveable around three different axes. End effector 406 may have tool 414. In these illustrative examples, tool 414 may be, for example, without limitation, an air gun sprayer, a high-volume low-pressure sprayer, a low-volume low-pressure sprayer, an electrostatic spraying device, an airless spray gun, a sanding device, and/or some other suitable type of tool. End effector 406 and/or tool 414 provide robot 400 a capability to perform finishing operations in these illustrative examples.

Mobility system 408 provides robot 400 a capability to move when performing finishing operations. In these illustrative examples, mobility system 408 provides robot 400 a capability to move on rails, such as those found in rail system 306 in FIG. 3. Mobility system 408 may have motor 416 and wheels 418. Motor 416 may turn wheels 418 in a manner that causes robot 400 to move along a rail in rail system 306.

Vision system 412 provides robot 400 a capability to identify the position of objects and/or other information needed to perform finishing operations. For example, vision system 412 may provide robot 400 a capability to view a part or portion of a part, such as a wing, on which finishing operations are performed.

In these examples, vision system 412 may be, for example, without limitation, a camera, a data processing system, and/or software capable of identifying the positions of objects and/or other information needed to perform finishing operations.

Controller 410 may execute programs and/or processes to control the operation of robot 400. In these examples, controller 410 may control arm 404, end effector 406, mobility system 408, and vision system 412. Vision system 412 provides input for controller 410 in these illustrative examples. Controller 410 may communicate with a computer system, such as, for example, computer system 310 in FIG. 3, to perform finishing operations.

In these illustrative examples, robot 400 may be implemented using, for example, without limitation, Flex Painter model IRB5500 as produced by Asea Brown Boveri (ABB), Limited. The illustration of robot 400 is not meant to imply physical or architectural limitations to the manner in which different illustrative embodiments may be implemented. In some illustrative embodiments, other components may be present in addition to or in place of the ones illustrated. In yet other illustrative embodiments, some of the components may be omitted.

For example, body 402 of robot 400 may be mounted on a lift system. In other illustrative embodiments, a lift, such as tower 430 or tower 432, may be implemented as part of robot 400 to provide robot 400 a capability to move body 402 upwards and downwards. This type of movement provides additional reach for robot 400. The use of a lift may provide robot 400 a capability to perform operations both on the top side, bottom side, and/or interior of a wing.

Figure 5:
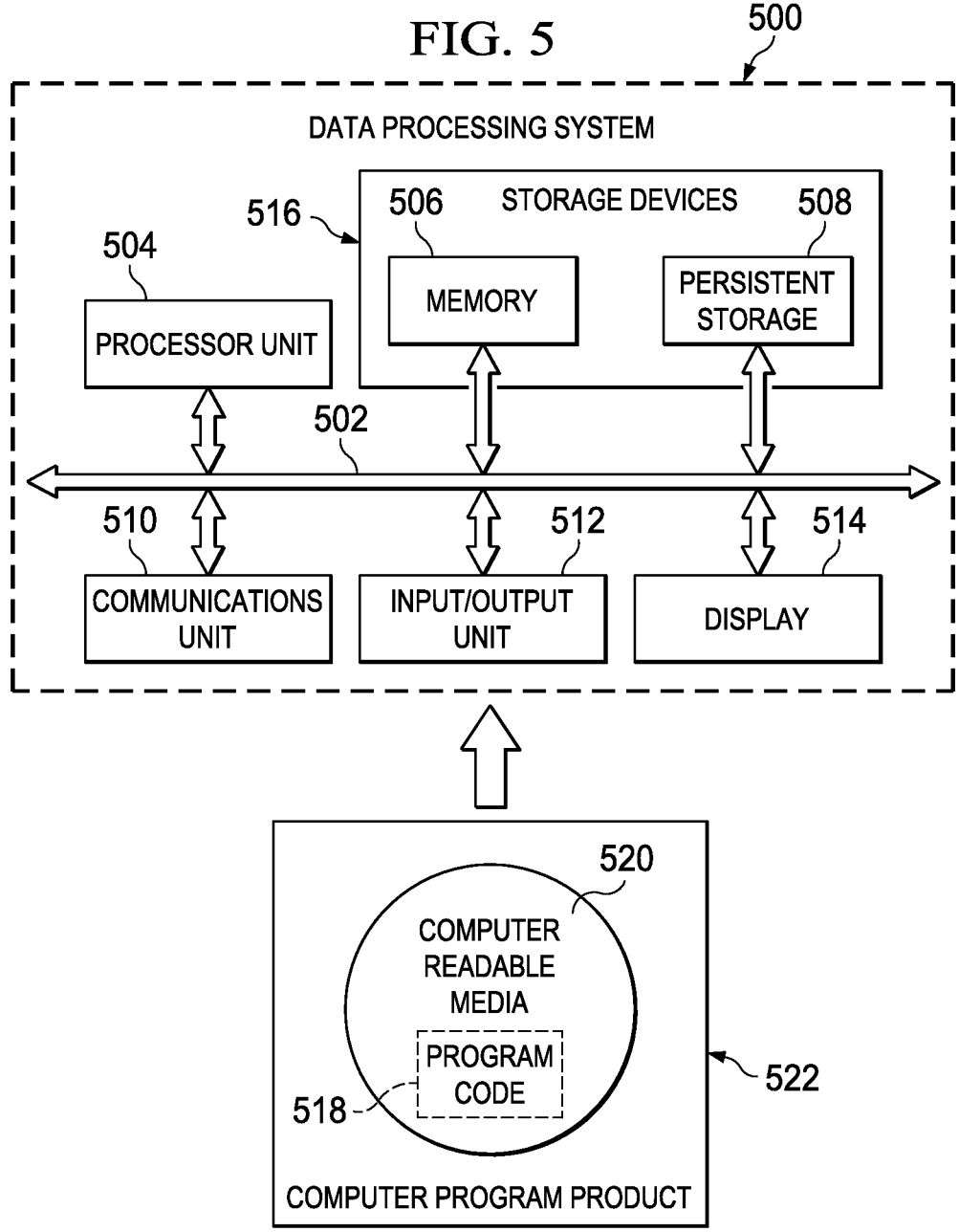

Turning now to FIG. 5, an illustration of a data processing system is depicted in accordance with an illustrative embodiment. Data processing system 500 is an example of a data processing system that may be used to implement a controller, such as controller 410 in FIG. 4. Additionally, data processing system 500 also may be used to implement one or more computers within computer system 310 in finishing environment 300 in FIG. 3.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory or any other suitable volatile or non-volatile storage device.

Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples.

Program code 518 may be transferred to data processing system 500 from computer readable media 520 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

Figure 6:
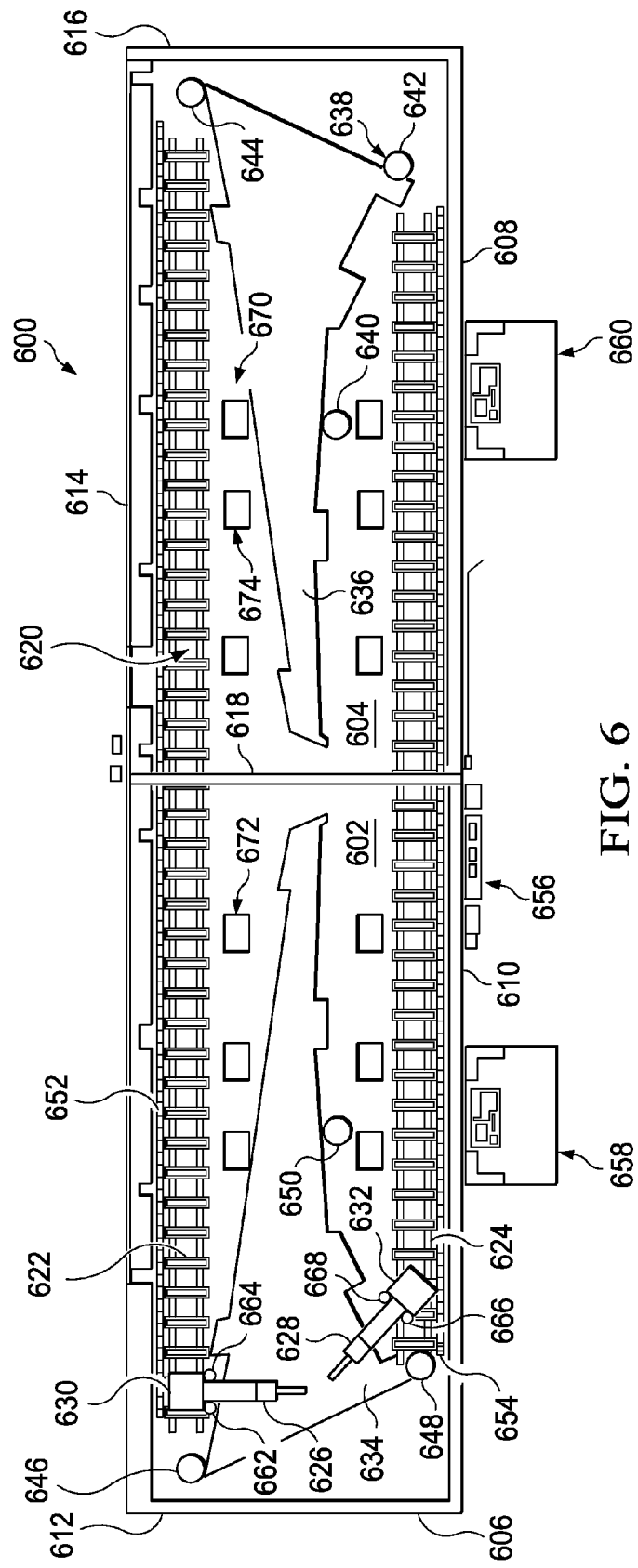

With reference now to FIG. 6, an illustration of an automated finishing system is depicted in accordance with an illustrative embodiment. In this illustrative example, automated finishing system 600 is an example of one implementation for automated finishing system 302 in finishing environment 300 in FIG. 3.

In this example, automated finishing system 600 encompasses finishing area 602 and finishing area 604. These finishing areas take the form of booth 606 and booth 608. These booths are formed by walls 610, 612, 614, 616, and 618. Booths 606 and 608 may be covered or open at the top in these illustrative examples.

Rail system 620 includes rail 622 and rail 624. In this depicted example, robot 626 moves along rail 622, and robot 628 moves along rail 624. Rail 622 extends through wall 618 into both finishing areas 602 and 604. Rail 624 also extends through wall 618 into both finishing areas 602 and 604.

Robot 626 and robot 628 may perform finishing operations on wing 634 and wing 636 in finishing areas 602 and 604, respectively. Robot 626 and robot 628 are capable of moving between finishing areas 602 and 604 on rails 622 and 624.

In these examples, lift system 638 may position wing 634 and wing 636 in a substantially horizontal orientation. Lift system 638 may lift and lower wing 634 and wing 636 independently of each other in a substantially horizontal orientation in these illustrative examples.

In this illustrative example, lift system 638 includes jacks 640, 642, 644, 646, 648, and 650. These jacks may be attached to wings 634 and 636. Jacks 640, 642, and 644 are used to position wing 636, while jacks 646, 648, and 650 are used to position wing 634.

Jacks 640, 642, 644, 646, 648, and 650 are lifting mechanisms. Each of these jacks may change height upward or downward. In the depicted examples, these jacks are hydraulic jacks that may move to change the position of wing 634 and/or wing 636.

Jacks are mechanical devices that may be used to lift loads. These jacks may employ a screw thread or a hydraulic cylinder to apply high forces to lift loads. Of course, any type of device capable of lifting loads may be used in addition to or in place of jacks in these examples.

In these illustrative examples, robot 626 is mounted on tower 630, and robot 628 is mounted on tower 632. Tower 630 and tower 632 may move on rail 622 and rail 624, respectively. Further, tower 630 and tower 632 may change the elevation height of robots 626 and 628, respectively. This change in height may allow the robots to perform finishing operations on different sides of wing 634 and wing 636.

In this illustrative example, automated finishing system 600 also has elevated cat track 652 and elevated cat track 654. Elevated cat tracks 652 and 654 are structures that hold electrical wires, computer wires, paint and fluid lines, air hoses, and/or other such components at an elevated position. Elevated cat tracks 652 and 654 prevent these components from getting in the path of the robot as it moves.

In these illustrative examples, robot controller 656 may control the operation of robot 626 and robot 628 in performing finishing operations on wings 634 and 636. Robot controller 656 may be implemented using a computer or some other type of data processing system, such as, for example, data processing system 500 in FIG. 5. In this illustrative example, operator console 658 and operator console 660 are present on wall 610. Operator consoles 658 and 660 are control stations at which an operator may select a paint or alignment program, monitor current operations, view video of operations, and/or perform other tasks.

In these examples, paint pots 662 and 664 are present on tower 630, while paint pots 666 and 668 are present on tower 632. These paint pots may contain a number of different finishing compounds, such as a top coat paint, a primer, a corrosion inhibiting compound, or some other suitable finishing compound.

Automated finishing system 600 also has ventilation system 670. In these examples, vents 672 in finishing area 602 and vents 674 in finishing area 604 are used to draw overspray away from wing 634 and wing 636, respectively, that may occur while robot 626 and robot 628 apply a number of finishing compounds to wing 634 and wing 636.

Figure 7:
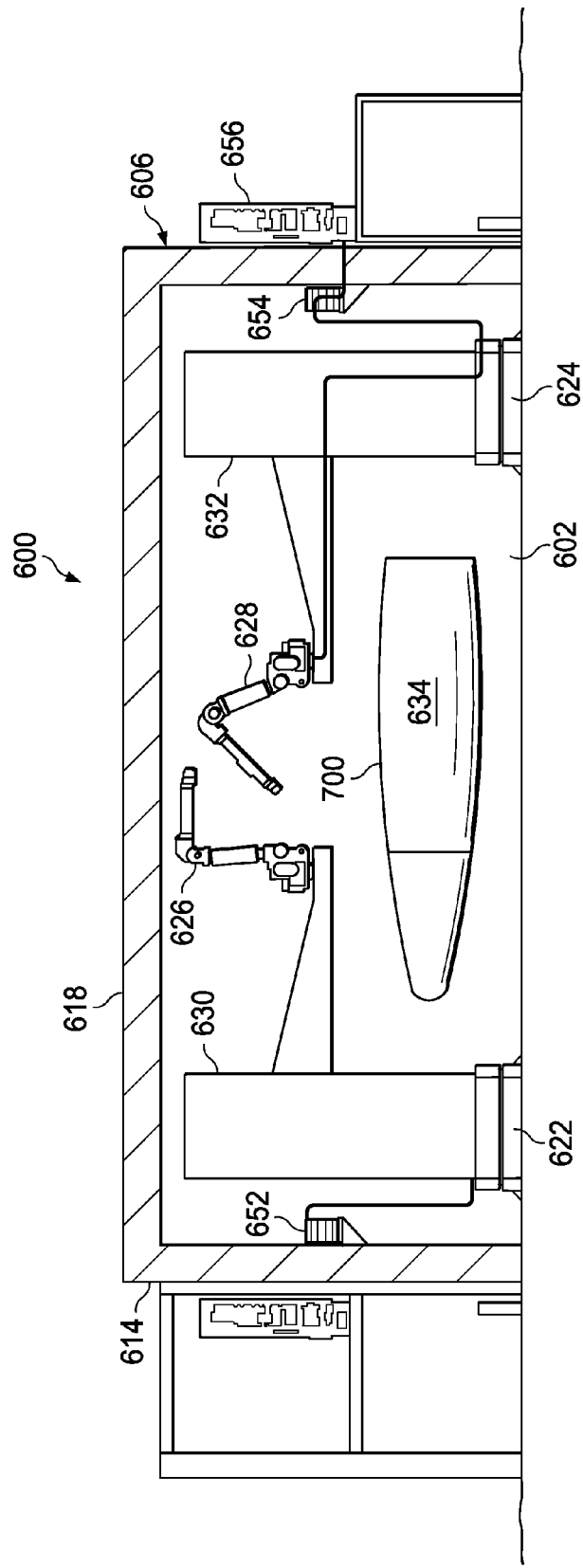

Turning now to FIG. 7, an illustration of a side view of an automated finishing system is depicted in accordance with an illustrative embodiment. In this example, a side view of automated finishing system 600 is depicted. As can be seen in this illustrative example, robot 626 and robot 628 are elevated over upper surface 700 of wing 634. Robots 626 and 628 are elevated over upper surface 700 by tower 630 and tower 632, respectively.

Figure 8:
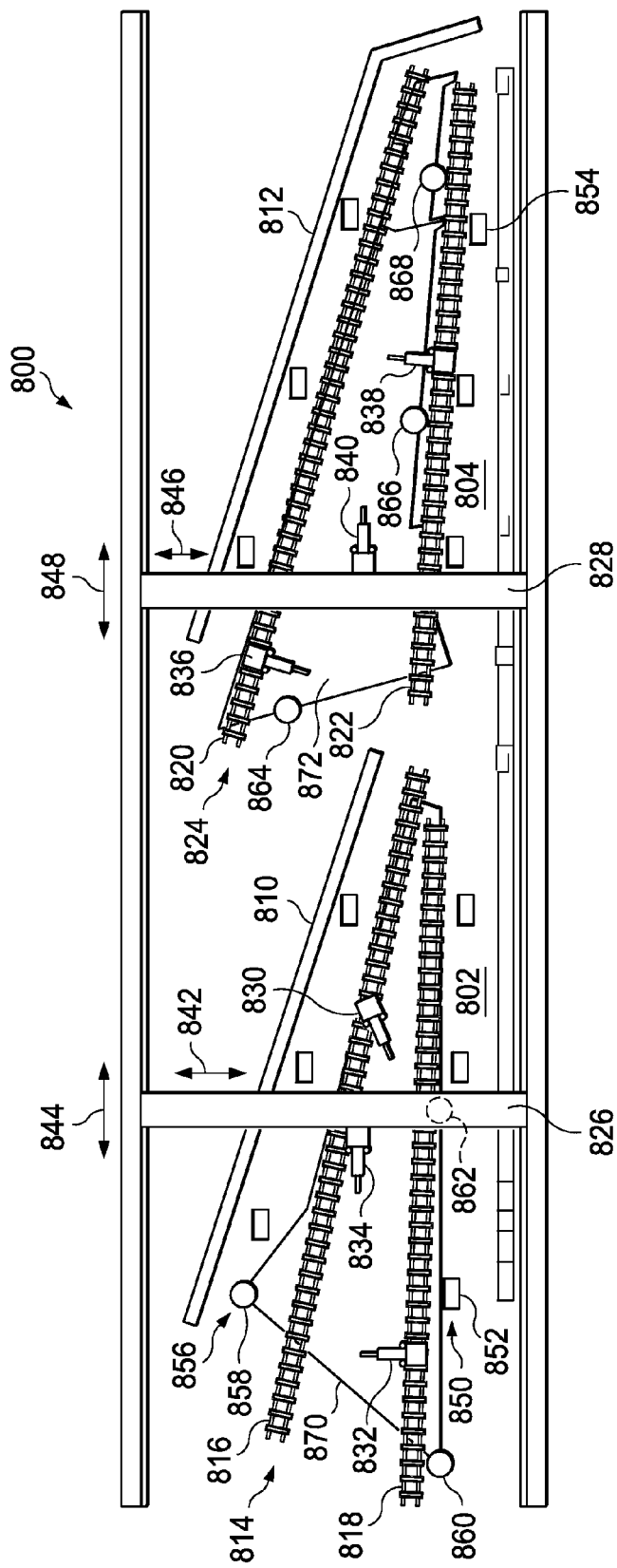
FIG. 8 is an illustration of an automated finishing system in accordance with an illustrative embodiment.

Turning now to FIG. 8, an illustration of an automated finishing system is depicted in accordance with an illustrative embodiment. In this illustrative example, automated finishing system 800 is an example of another implementation for automated finishing system 302 in FIG. 3.

In this illustrative example, wall 810 encompasses finishing area 802, while wall 812 encompasses finishing area 804. Rail system 814, in this example, contains rails 816, 818, 820, and 822. Rail 816 and rail 818 are located in finishing area 802, while rail 820 and rail 822 are located in finishing area 804.

Rail system 814 also includes bridge system 824. Bridge system 824 contains moveable bridge 826 and moveable bridge 828. Moveable bridge 826 moves over finishing area 802, while moveable bridge 828 moves over finishing area 804.

In these illustrative examples, robots 830, 832, and 834 perform finishing operations within finishing area 802, while robots 836, 838, and 840 perform finishing operations in finishing area 804. Robot 830 moves along rail 816, while robot 832 moves along rail 818. Robot 834 moves on moveable bridge 826. For example, robot 834 may move along moveable bridge 826 in the direction of arrow 842, while moveable bridge 826 may move along the direction of arrow 844.

Robot 836 moves along rail 820, while robot 838 moves along rail 822. Robot 840 is moveably located on moveable bridge 828. In this example, robot 840 may move along the direction of arrow 846, while moveable bridge 828 may move along the direction of arrow 848.

Additionally, automated finishing system 800 has ventilation system 850, which has vents 852 in finishing area 802 and vents 854 in finishing area 804. In this illustrative example, automated finishing system 800 also has lift system 856. Lift system 856, in this example, includes jacks 858, 860, and 862 located in finishing area 802, and jacks 864, 866, and 868 in finishing area 804.

Jacks 858, 860, and 862 may be used to position wing 870 in finishing area 802, while jacks 864, 866, and 868 may position wing 872 in finishing area 804.

In this configuration, robots 830, 832, 836, and 838 may perform finishing operations on the lower side of wings 870 and 872 in these illustrative examples. Robots 834 and 840 on moveable bridges 826 and 828, respectively, perform finishing operations on the upper side of wings 870 and 872. Additionally, robots 830, 832, 836, and 838 perform finishing operations on interior portions of wings 870 and 872. In other configurations, the different robots may perform different operations on different portions of wings 870 and 872.

Figure 9:
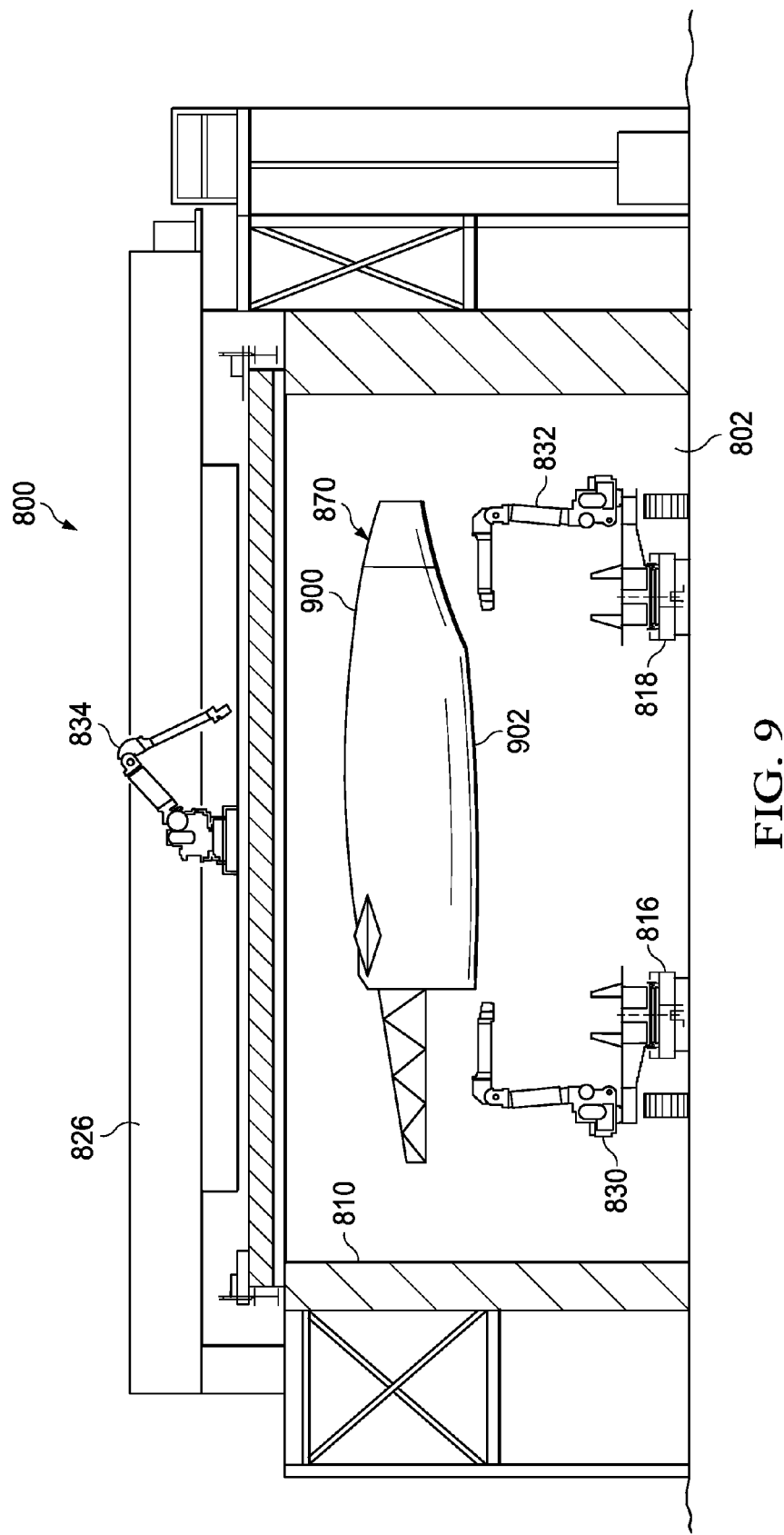
FIG. 9 is an illustration of a side view of an automated finishing system in accordance with an illustrative embodiment.

Turning now to FIG. 9, an illustration of a side view of an automated finishing system is depicted in accordance with an illustrative embodiment. In this example, a side view of automated finishing system 800 shows robot 834 located over upper surface 900 of wing 870. Robots 830 and 832 are located underneath lower side 902 of wing 870.

The illustrations of finishing systems in FIGS. 6-9 are provided as example implementations for automated finishing system 302 in FIG. 3. These illustrations are not meant to limit the manner in which other illustrative embodiments may be implemented. These particular examples of lift systems are not meant to limit the manner in which other illustrative embodiments may be implemented.

For example, although the hydraulic lift systems are illustrated using jacks, other types of lift systems may be used. For example, without limitation, overhead cranes may be employed in the lift system, depending on the particular implementation. Further, in yet other illustrative embodiments, other numbers of finishing areas and booths may be present other than the two illustrated. For example, in some illustrative embodiments, only a single booth may be present.

In yet other illustrative embodiments, three, six, or some other number of booths and finishing areas may be present. Further, in some other illustrative embodiments, the wing may be moved from one booth to another booth to perform different operations in the same orientation.

Further, these embodiments also recognize and take into account that it would be desirable to reduce the amount of time needed to apply more than one layer of finishing compounds onto a wing. In particular, it would be desirable to reduce the time needed to paint graphics on top of another layer of paint or other type of finishing compound. Thus, one or more illustrative embodiments provide a method and apparatus for spraying a liquid toward a surface of an object. In one illustrative embodiment, an apparatus comprises a nozzle and a number of disks. The nozzle is configured to generate a spray of a liquid toward a surface. The number of disks is positioned relative to the nozzle and configured to form a gap through which a portion of the spray of the liquid passes towards the surface of the object.

Figure 10:
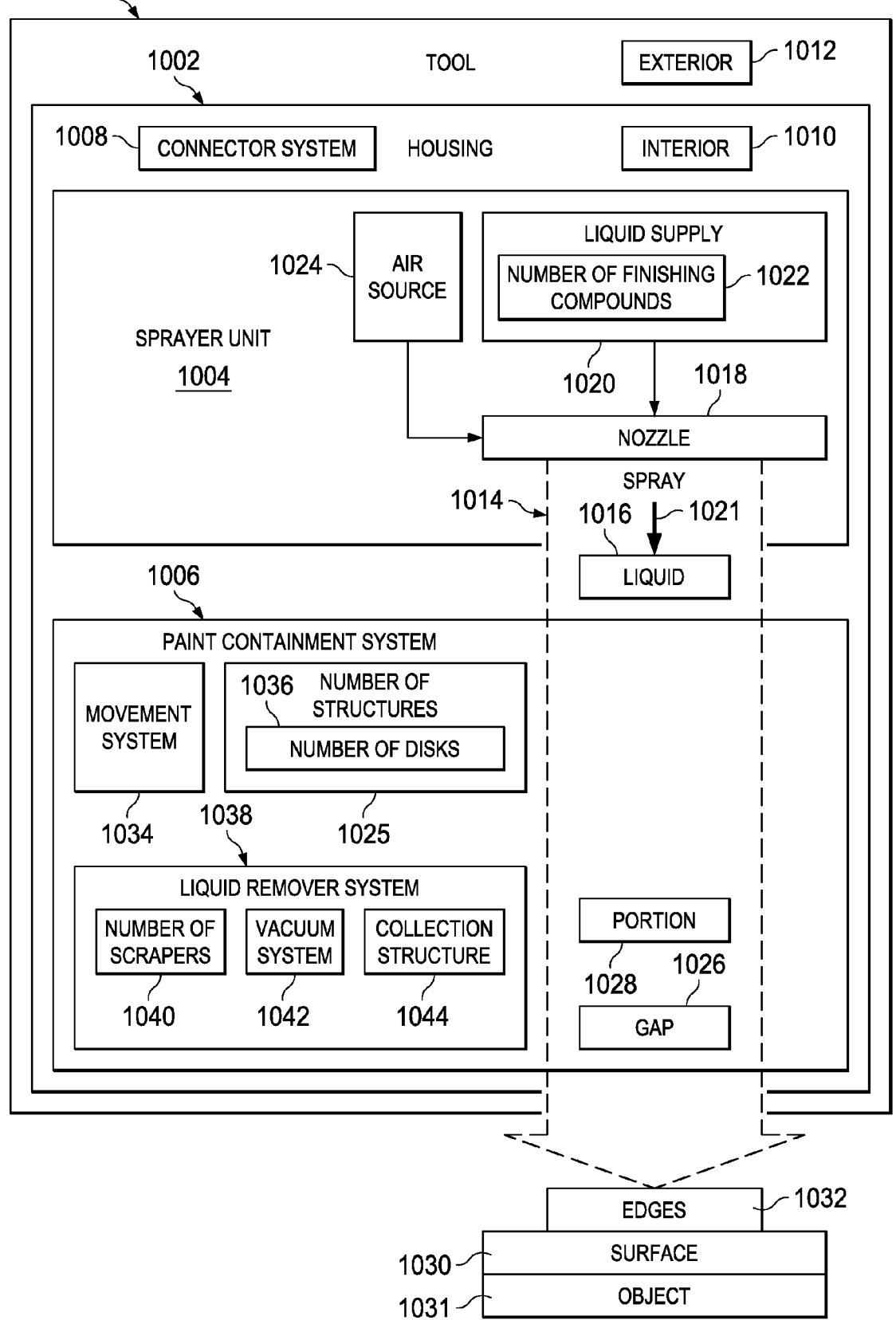
FIG. 10 is an illustration of a tool in accordance with an illustrative embodiment.

Turning now to FIG. 10, an illustration of a tool is depicted in accordance with an illustrative embodiment. In this figure, tool 1000 is an example of an implementation for tool 414 in FIG. 4.

As depicted, tool 1000 includes housing 1002, sprayer unit 1004, paint containment system 1006, and connector system 1008. Sprayer unit 1004, paint containment system 1006, and connector system 1008 are associated with housing 1002.

When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Housing 1002 is a physical structure configured to provide support for different components within tool 1000. In these illustrative examples, housing 1002 may be comprised of various materials. For example, housing 1002 may be comprised of at least one of metal, plastic, a composite material, aluminum, polycarbonate, ceramic, and other suitable types of materials.

In these illustrative examples, one or more components in tool 1000 may be located within interior 1010 of housing 1002. For example, sprayer unit 1004 and paint containment system 1006 may be located within interior 1010 of housing

1002. Connector system 1008 may be located in interior 1010, exterior 1012, or a combination of the two with respect to housing 1002.

Sprayer unit 1004 is configured to spray 1014 liquid 1016. In these illustrative examples, sprayer unit 1004 may include nozzle 1018 and liquid supply 1020. Nozzle 1018 is configured to generate spray 1014 of liquid 1016 using liquid supply 1020. In these illustrative examples, spray 1014 of liquid 1016 is directed along spray axis 1021. Spray axis 1021 is an axis extending from nozzle 1018. In these illustrative examples, spray axis 1021 extends centrally through nozzle 1018.

In these illustrative examples, liquid supply 1020 may contain number of finishing compounds 1022. Number of finishing compounds 1022 may be selected from one of paint, a top coat paint, a waxy oil, an adhesive, a lubricant, a primer, a sealant, and other suitable finishing compounds that may be applied to the surface of an object. In these illustrative examples, air source 1024 provides pressurized air to cause liquid 1016 from liquid supply 1020 to become spray 1014 of liquid 1016 when passing through nozzle 1018.

In these illustrative examples, paint containment system 1006 includes number of structures 1025. Number of structures 1025 in paint containment system 1006 is configured to form gap 1026 through which portion 1028 of spray 1014 of liquid 1016 passes through toward the surface of an object. In these examples, number of structures 1025 takes the form of number of disks 1036.

Gap 1026 is an opening or space between two of number of structures 1025 in paint containment system 1006. As depicted, paint containment system 1006 is configured to "mask" surface 1030 of object 1031 without paint containment system 1006 or other portions of tool 1000 contacting surface 1030 of object 1031. Paint containment system 1006 is configured to provide a capability to generate edges 1032 of liquid 1016 on surface 1030 without requiring number of structures 1025 to be placed on surface 1030 to define edges 1032 in a desired manner. Liquid 1016 in spray 1014 of liquid 1016 is deposited between edges 1032 on surface 1030 of object 1031.

In these illustrative examples, movement system 1034 is configured to rotate number of disks 1036. In these illustrative examples, movement system 1034 may be implemented using one or more motors connected to number of disks 1036. A motor in these motors may be selected from at least one of a pneumatic motor, an electric motor, a hydraulic motor, or some other suitable type of motor or actuator that is capable of causing number of disks 1036 to rotate. As depicted, paint containment system 1006 also includes liquid remover system 1038. Liquid remover system 1038 is positioned relative to number of disks 1036 in these illustrative examples. Liquid remover system 1038 is configured to remove liquid 1016 that may be on number of disks 1036. In these illustrative examples, liquid remover system 1038 may comprise at least one of number of scrapers 1040, vacuum system 1042, and other suitable types of vacuum systems. Further, liquid remover system 1038 also may include collection structure 1044. Collection structure 1044 may be one or more reservoirs positioned relative to collect liquid 1016 that may be removed from number of disks 1036. Collection structure 1044 may be used in conjunction with number of scrapers 1040.

Vacuum system 1042 is used to remove liquid 1016 from number of disks 1036. Liquid remover system 1038 is configured to remove liquid 1016 from spray 1014 that does not pass through gap 1026.

In these illustrative examples, connector system 1008 provides a physical connection for tool 1000 to an end effector on the end of a robotic arm. Further, connector system 1008 also may provide utilities to components within tool 1000. For example, connector system 1008 may provide power, pressurized air, vacuum, and other utilities that may be used by tool 1000.

Figure 11:
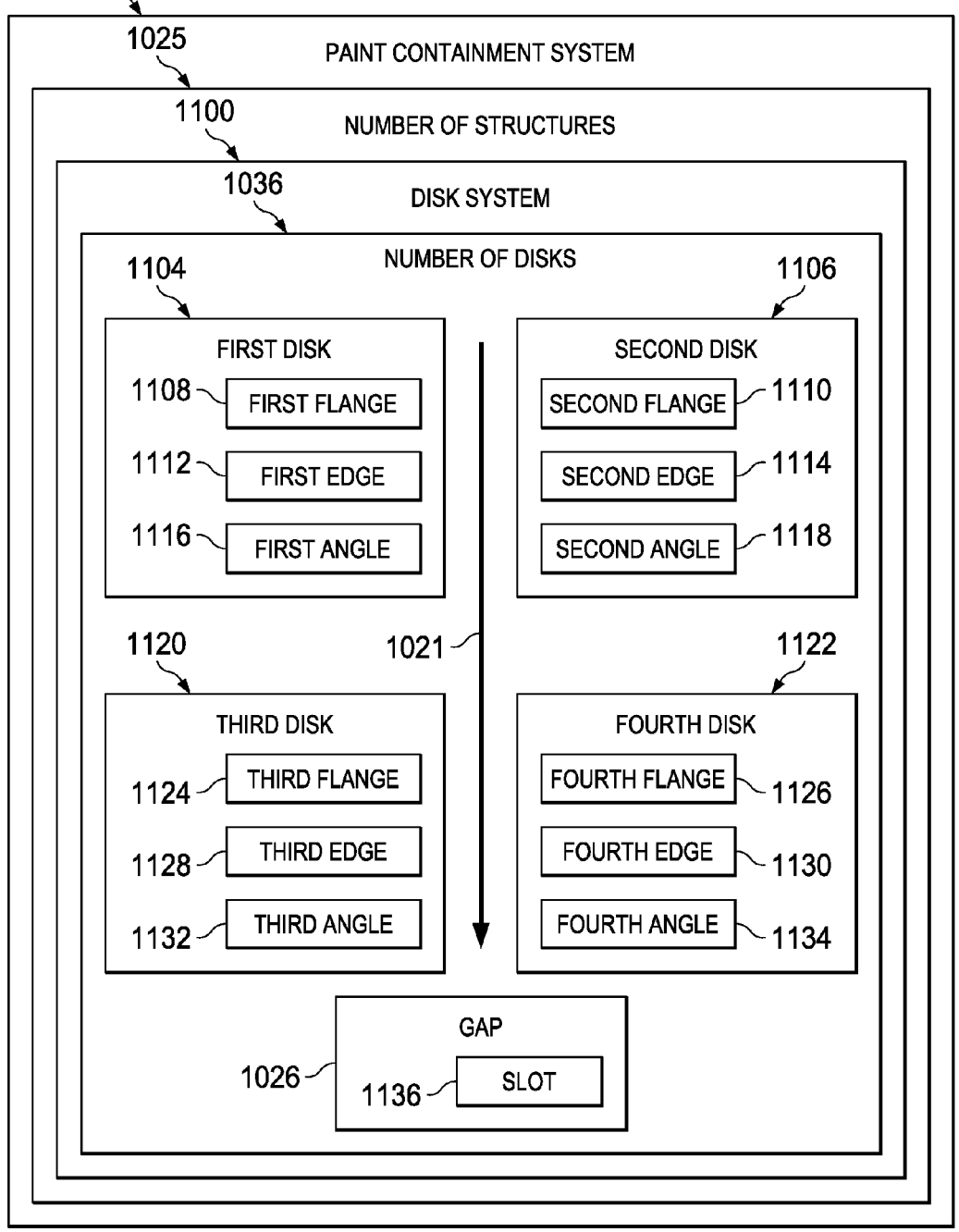
FIG. 11 is an illustration of a paint containment system in accordance with an illustrative embodiment.

With reference now to FIG. 11, an illustration of a paint containment system is depicted in accordance with an illustrative embodiment. As depicted, number of structures 1025 in paint containment system 1006 comprises disk system 1100, which includes number of disks 1036. In these illustrative examples, number of disks 1036 is positioned relative to nozzle 1018 in FIG. 1. This positioning of number of disks 1036 is configured to form gap 1026 through which portion 1028 of spray 1014 of liquid 1016 passes toward surface 1030 in FIG. 1.

For example, when number of disks 1036 comprises first disk 1104 and second disk 1106, the positioning of first disk 1104 and second disk 1106 forms gap 1026. In these illustrative examples, first disk 1104 has first flange 1108, and second disk 1106 has second flange 1110. First flange 1108 extends around first edge 1112 of first disk 1104. Second flange 1110 extends around second edge 1114 of second disk 1106. These flanges are the structures on the disks that define gap 1026 in these illustrative examples.

As depicted, first disk 1104 and second disk 1106 are positioned at first angle 1116 and second angle 1118, respectively, to spray axis 1021. Further, in the illustrative examples, number of disks 1036 in disk system 1100 of paint containment system 1006 also may include third disk 1120 and fourth disk 1122. Third disk 1120 may have third flange 1124, and fourth disk 1122 may have fourth flange 1126.

In these illustrative examples, third flange 1124 extends around third edge 1128 of third disk 1120. Fourth flange 1126 extends around fourth edge 1130 of fourth disk 1122. Third disk 1120 may be positioned at third angle 1132 relative to spray axis 1021. Fourth disk 1122 may be positioned at fourth angle 1134 relative to spray axis 1021.

When third disk 1120 and fourth disk 1122 are present in number of disks 1036, these disks, in conjunction with first disk 1104 and second disk 1106, define gap 1026 in the form of slot 1136.

Gap 1026 is a space or opening between components on at least two sides. In these illustrative examples, gap 1026 may be, for example, about 0.25 inches wide. Of course, gap 1026 may be any width of the spray pattern for spray 1014 of liquid 1016 that results in a stripe or line having edges 1032 in FIG. 1. In these examples, a slot is an elongate opening or slit formed by number of disks 1036. Slot 1136 is an elongate aperture. Slot 1136 may be defined by a perimeter enclosed by number of disks 1036. In these illustrative examples, slot 1136 may have the same width as gap 1026. The length of slot 1136 may be the same or greater than the width in this illustrative example. Of course, any dimensions for the width and length may be used, depending on the particular implementation.

In this manner, paint containment system 1006 may provide one or more of edges 1032 that are clean and have a desired finish when spraying liquid 1016 onto surface 1030 of object 1031 in FIG. 10. These edges are made without placing physical structures onto surface 1030 of object 1031.

The illustration of tool 1000 in FIG. 10 and paint containment system 1006 in FIG. 11 is not meant to imply physical or architectural limitations to the manner in which an illustrative embodiment may be implemented. Other components in addition to or in place of the ones illustrated may be used.

Some components may be unnecessary. Also, the blocks are presented to illustrate some functional components. One or more of these blocks may be combined, divided, or combined and divided into different blocks when implemented in an illustrative embodiment.

For example, liquid supply 1020 may be located externally to tool 1000. For example, liquid supply 1020 may be an external container of liquid 1016 that is applied to sprayer unit 1004 through connector system 1008. In another illustrative example, a mechanical pump may be used in place of an air source to pressurize liquid 1016. Liquid 1016, under pressure, may then pass through nozzle 1018 to form spray 1014 of liquid 1016. Also, nozzle 1018 may have various configurations to provide desired patterns for spray 1014.

In still other illustrative examples, tool 1000 may include a compressor, a vacuum unit, and some other suitable component to provide fluid pressure or pressurized air to sprayer unit 1004 and vacuum to liquid remover system 1038.

As another example, number of structures 1025 may take other forms other than number of disks 1036. For example, number of structures 1025 in paint containment system 1006 may be, for example, two sheets of continuous feed masking paper, absorbent material, and/or some other suitable material. These sheets may be positioned parallel to each other to define gap 1026.

These sheets may be supplied and received on a roller feed system. Such a feed system may have rollers configured to supply new masking material and continuously remove the overspray by rolling up and containing the material with overspray of liquid 1016.

Tool 1000 may also include additional spray units. Additional disks may be associated with these components to mask the spray generated by these additional spray units. These additional spray units may be configured to form a wider line than is possible with just sprayer unit 1004, or these sprayer units may spray different colors, different types of liquids, or both.

Figure 12:
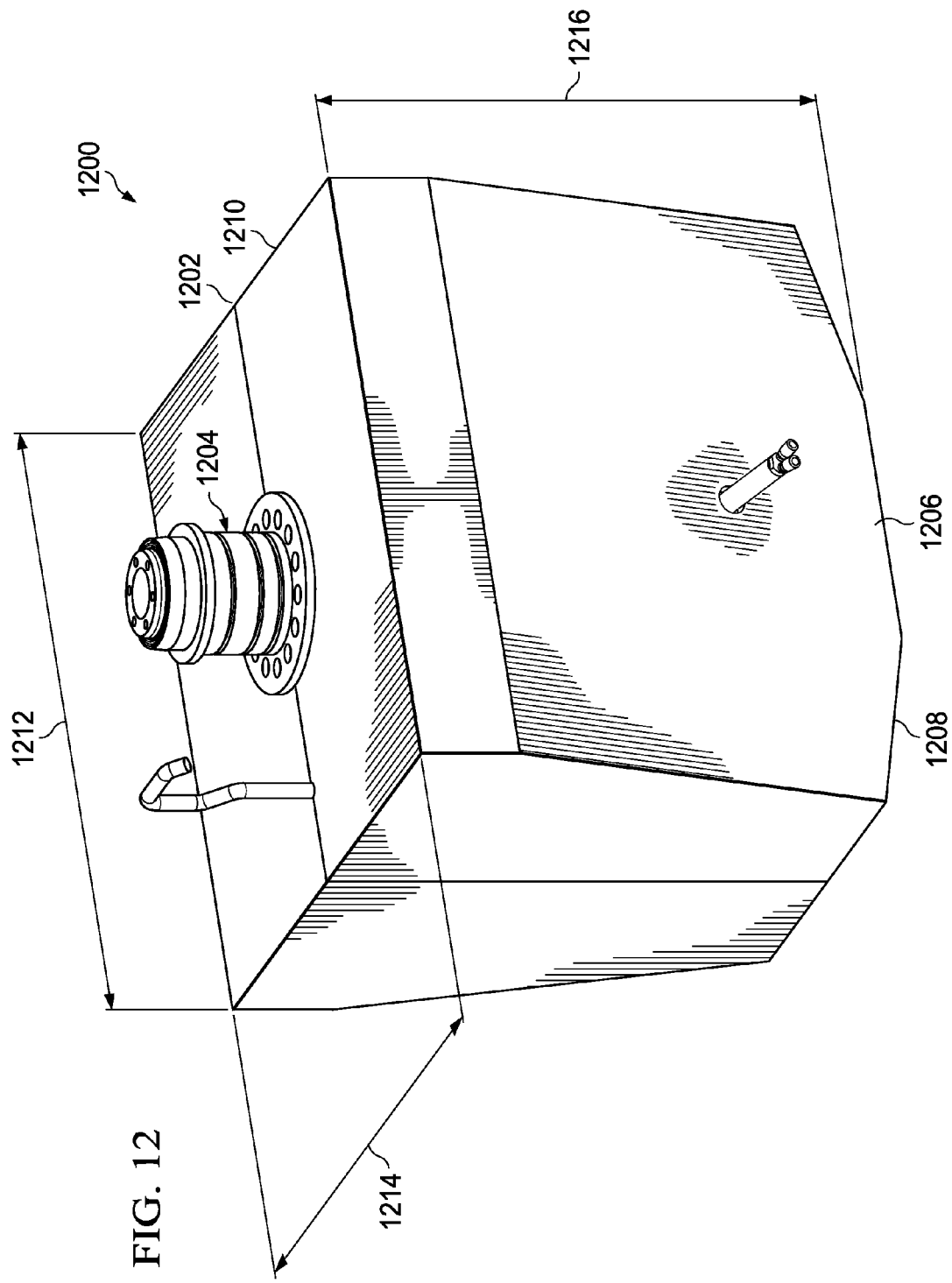
FIG. 12 is an illustration of a tool in accordance with an illustrative embodiment.

With reference next to FIG. 12, an illustration of a tool is depicted in accordance with an illustrative embodiment. In this particular figure, a perspective view of tool 1200 is depicted. Tool 1200 is an example of a physical implementation for tool 1000 depicted in block form in FIG. 10.

Housing 1202 has connector system 1204. Connector system 1204 is configured to be connected to an end effector of a robot. In particular, connector system 1204 is configured to be connected to an end effector on a robotic arm of a robot. In these illustrative examples, in addition to providing a physical connection to an end effector, connector system 1204 also may provide utilities used by tool 1200.

Housing 1202 may be comprised of any suitable material. For example, housing 1202 may be comprised of at least one of metal, aluminum, steel, plastic, ceramic, a composite material, and other suitable types of materials.

As illustrated, surface 1206 on end 1208 may be positioned relative to the surface of an object. A number of finishing compounds may be sprayed from end 1208 of tool 1200 onto the surface of the object. In this illustrative example, end 1210 may have length 1212 and width 1214. Housing 1202 may have height 1216. In these examples, length 1212 may be about 20 inches, width 1214 may be about 20 inches, and height 1216 may be about 20 inches.

Figure 13:
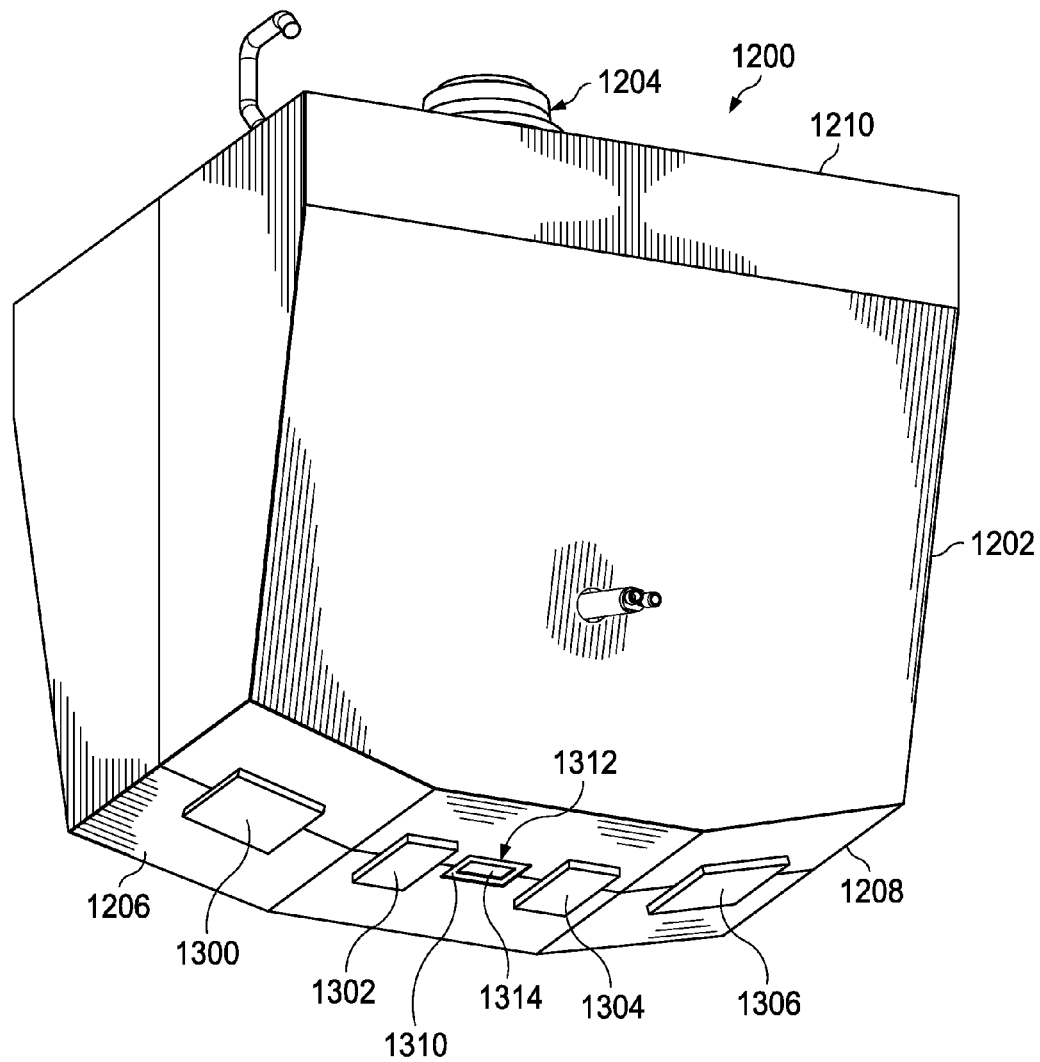
FIG. 13 is an illustration of a tool in accordance with an illustrative embodiment.

With reference now to FIG. 13, an illustration of a tool is depicted in accordance with an illustrative embodiment. In this perspective view of tool 1200, pads 1300, 1302, 1304, and 1306 are associated with surface 1206 of end 1208. These pads are configured to reduce inconsistencies that may occur on an object if unintended contact between tool 1200 and an object occurs.

In this illustrative example, opening 1310 is present in housing 1202. A spray of liquid may pass through opening 1310. However, in these illustrative examples, tool 1200 may include paint containment system 1312 to define opening 1314 that is smaller than opening 1310 for applying finishing compounds.

Figure 14:
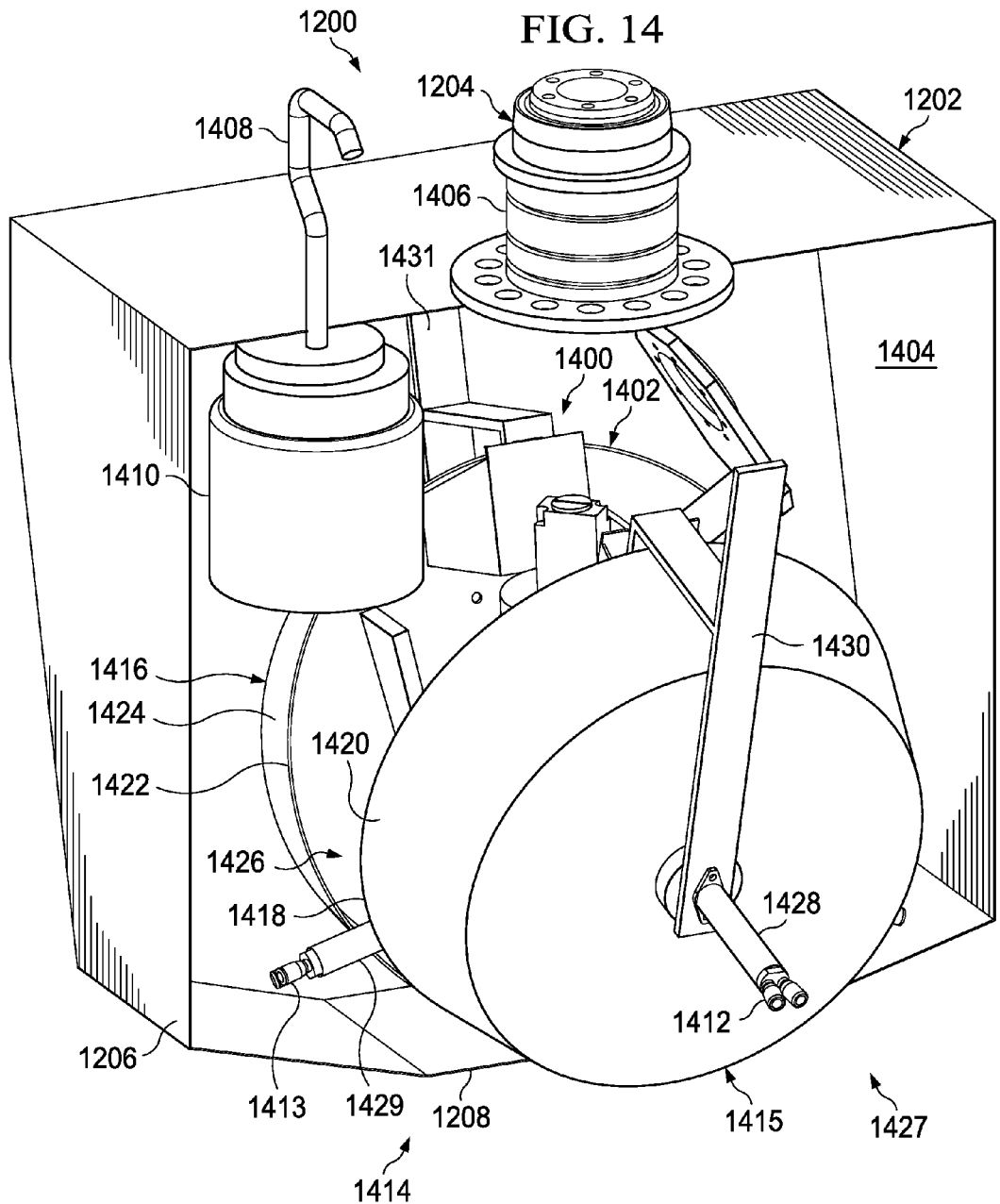
FIG. 14 is an illustration of an exposed view of a tool in accordance with an illustrative embodiment.

With reference next to FIG. 14, an exposed view of a tool is depicted in accordance with an illustrative embodiment. As depicted, tool 1200 is seen in an exposed view. In this exposed view, sprayer unit 1400 and paint containment system 1402 can be seen in interior 1404 of housing 1202.

Connector 1406 in connector system 1204 provides a physical connection for tool 1200 to an end effector. Connector 1408 in connector system 1204 provides a connection for pressurized air to liquid source 1410 in sprayer unit 1400. Connector 1412 and connector 1413 provide connections to a pressurized air source for pneumatic motor 1428 and pneumatic motor 1429, respectively, in these illustrative examples.

As seen in FIG. 14, paint containment system 1402 includes number of structures 1414. As depicted, number of structures 1414 comprises first disk 1415 and second disk 1416. First disk 1415 has first flange 1418 that extends around first edge 1420 of first disk 1415. Second disk 1416 has second flange 1422 that extends around second edge 1424 of second disk 1416.

Gap 1426 is located between first disk 1415 and second disk 1416. In particular, gap 1426 is defined by first flange 1418 and second flange 1422.

First disk 1415 and second disk 1416 may be moved using movement system 1427. In this illustrative example, movement system 1427 includes a number of motors. The motors are configured to rotate first disk 1415 and second disk 1416. In this view, pneumatic motor 1428 is connected to first disk 1415. Another pneumatic motor is connected to second disk 1416 but is not seen in this view.

Support structure 1430 and support structure 1431 provide support for first disk 1415 and second disk 1416, respectively. These support structures are associated with interior 1404 of housing 1202 in these illustrative examples. These structures may be fixed or moveable. When these structures are moveable, the gap formed between the structures may be adjusted in size, shape, or both.

Figure 15:
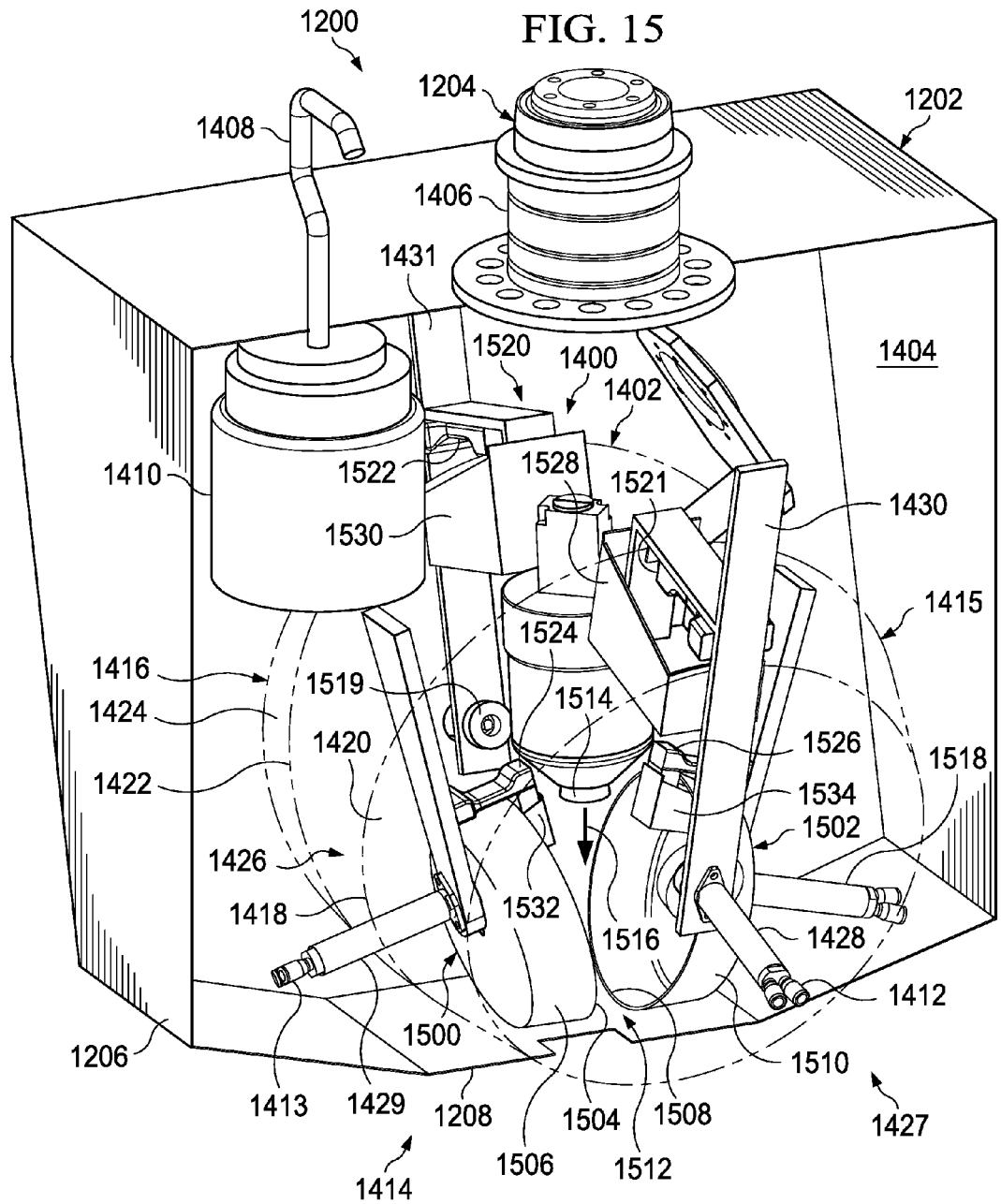
FIG. 15 is an illustration of a tool in accordance with an illustrative embodiment.

With reference now to FIG. 15, an illustration of a tool is depicted in accordance with an illustrative embodiment. In this further exposed view of tool 1200, third disk 1500 and fourth disk 1502 can be seen. Third disk 1500 has third flange 1504 that extends around third edge 1506 of third disk 1500. Fourth disk 1502 has fourth flange 1508 that extends around fourth edge 1510 of fourth disk 1502. Slot 1512 is defined by first disk 1415, second disk 1416, third disk 1500, and fourth disk 1502. More specifically, first flange 1418, second flange 1422, third flange 1504, and fourth flange 1508 define slot 1512.

These disks may be comprised of different types of materials. For example, the disks may be comprised of a material selected from at least one of metal, aluminum, steel, polycarbonate, plastic, ceramic, a composite material, and some other suitable material.

Additionally, in this illustrative example, nozzle 1514 in sprayer unit 1400 can be seen within housing 1202. Nozzle 1514 may generate a spray of liquid directed along spray axis 1516.

As can be seen, first disk 1415 is positioned at a first angle relative to spray axis 1516. In a similar fashion, second disk

1416 is positioned at a second angle with respect to spray axis 1516. Third disk 1500 is positioned at a third angle relative to spray axis 1516, and fourth disk 1502 is positioned at a fourth angle relative to spray axis 1516.

Additionally, third disk 1500 and fourth disk 1502 are also moveable. In these illustrative examples, third disk 1500 and fourth disk 1502 may be rotated by pneumatic motor 1429 and pneumatic motor 1518. Pneumatic motor 1429 is connected to third disk 1500, while pneumatic motor 1518 is connected to fourth disk 1502. Also visible in this view is pneumatic motor 1519, which is connected to second disk 1416.

Additionally, paint containment system 1402 in tool 1200 also includes liquid remover system 1520. In particular, liquid remover system 1520 includes first scraper 1521, second scraper 1522, third scraper 1524, and fourth scraper 1526. Liquid remover system 1520 also includes first reservoir 1528, second reservoir 1530, third reservoir 1532, and fourth reservoir 1534.

First scraper 1521 and first reservoir 1528 are positioned relative to first disk 1415. In particular, first scraper 1521 is positioned relative to first flange 1418. Second scraper 1522 and second reservoir 1530 are positioned relative to second disk 1416 and, in particular, with respect to second flange 1422. Third scraper 1524 and third reservoir 1532 are positioned relative to third disk 1500 and, in particular, with respect to third flange 1504. Fourth scraper 1526 and fourth reservoir 1534 are positioned relative to fourth disk 1502 and, in particular, with respect to fourth flange 1508.

These scrapers are configured to remove a portion of the liquid blocked by the flanges in the disks when a spray of liquid is directed towards slot 1512. In particular, the flanges and the disks may block a portion of the spray of the liquid. The scrapers may scrape this liquid off the flanges and into the reservoirs. These reservoirs may be emptied from time to time. The liquid on the flanges of the disks are removed to avoid the liquid dripping through slot 1512 and onto a surface of an object.

These flanges may be constructed from a number of different types of materials. For example, the flanges may be comprised of rubber, silicone, a porous cellulose material, and other suitable types of materials. The reservoirs also may be comprised of various types of materials. These materials may be selected from at least one of metal, aluminum, steel, polycarbonate, plastic, ceramic, a composite material, and some other suitable materials.

Figure 16:
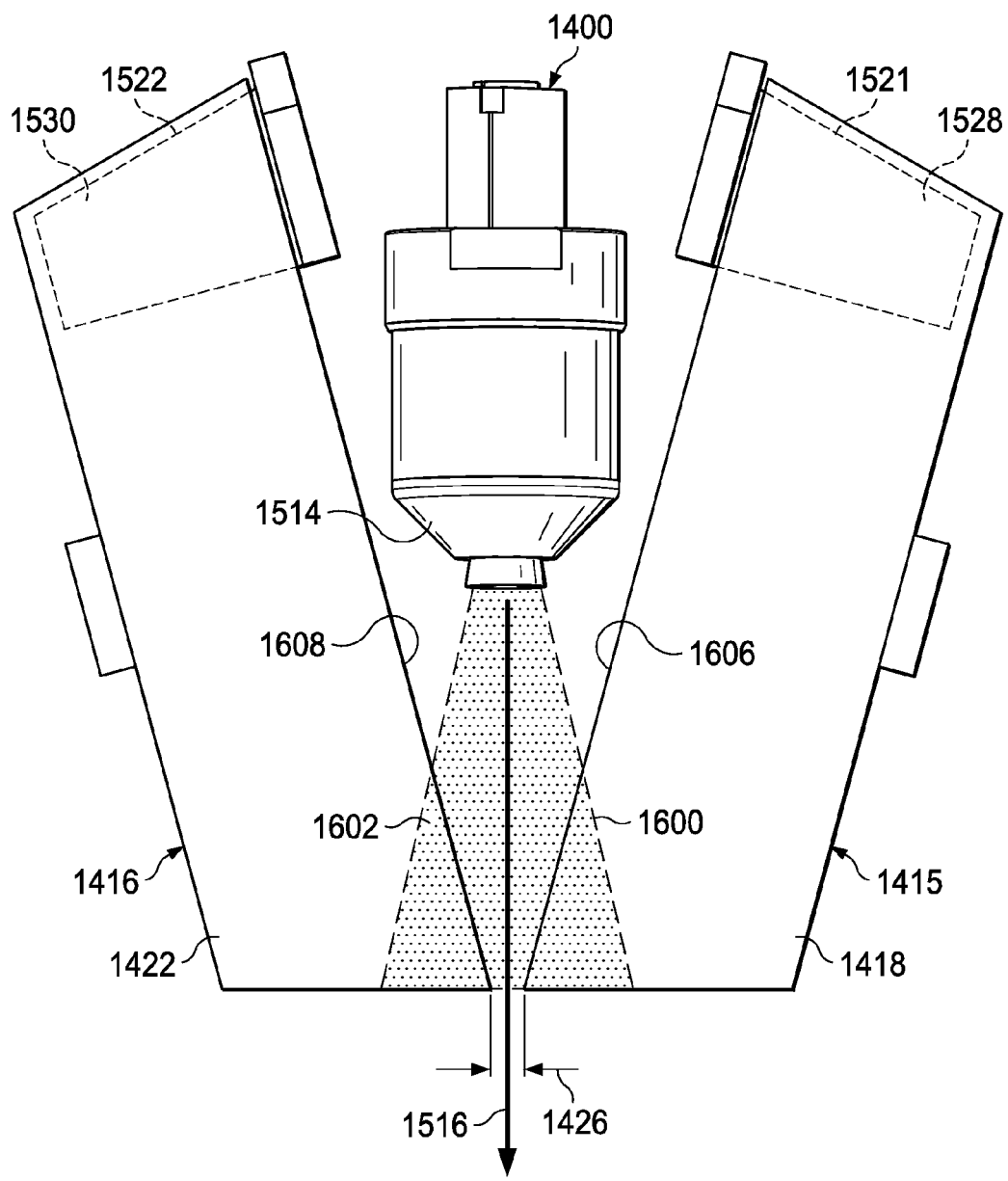
FIG. 16 is an illustration of a gap defined by a paint containment system in accordance with an illustrative embodiment.

Turning now to FIG. 16, an illustration of a gap defined by a paint containment system is depicted in accordance with an illustrative embodiment. In this example, first disk 1415 and second disk 1416 are illustrated as being positioned relative to nozzle 1514. In this particular example, third disk 1500 and fourth disk 1502 have been removed from tool 1200. With this use of first disk 1415 and second disk 1416, these two structures define gap 1426.

Further, first scraper 1521 and first reservoir 1528 are shown positioned relative to first flange 1418 of first disk 1415. Second scraper 1522 and second reservoir 1530 are shown positioned relative to second flange 1422 of second disk 1416. Other components are not shown in this depicted figure to avoid obscuring an illustration of features for an illustrative embodiment.

As depicted, nozzle 1514 generates spray 1600 of liquid 1602. Spray 1600 has a substantially full cone shape and is directed along spray axis 1516 towards gap 1426 defined by first disk 1415 and second disk 1416. Of course, spray 1600 of liquid 1602 may have other forms. For example, spray 1600 of liquid 1602 may be a hollow cone, a flat stream, or some other suitable shape, depending on the particular implementation.

In this illustrative example, portions of liquid 1602 may collect on first interior surface 1606 on first flange 1418 on first disk 1415. Portions of liquid 1602 also may collect on second interior surface 1608 of second flange 1422 on second disk 1416. These portions that collect on interior surfaces may be referred to as overspray.

As depicted, first scraper 1521 may scrape first interior surface 1606 to remove liquid 1602 from first interior surface 1606. This excess liquid may be collected in first reservoir 1528.

In a similar fashion, liquid 1602 on second interior surface 1608 may be removed from second interior surface 1608 by second scraper 1522. This excess liquid may be collected in second reservoir 1530. In this manner, a dripping of liquid 1602 through gap 1426 may be reduced or avoided.

Figure 17:
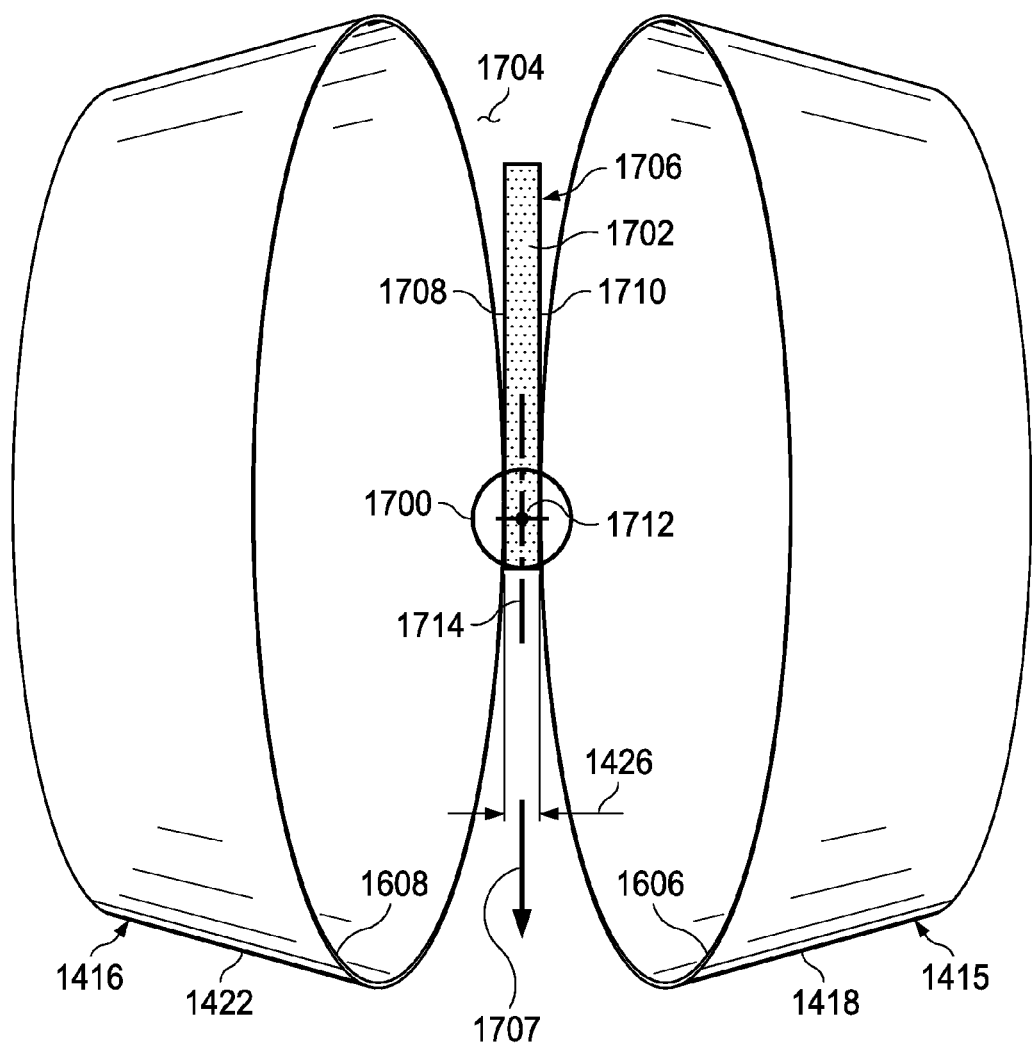
FIG. 17 is an illustration of a liquid sprayed onto a surface through a gap in a paint containment system in accordance with an illustrative embodiment.

Turning now to FIG. 17, an illustration of a liquid sprayed onto a surface through a gap in a paint containment system is depicted in accordance with an illustrative embodiment. In this illustrative example, perimeter 1700 is a perimeter for spray 1600 of liquid 1602 from nozzle 1514 in FIG. 16. In this illustrative example, liquid 1602 takes the form of paint 1702 sprayed onto surface 1704 in the shape of line 1706 as tool 1200 in FIG. 12 moves in the direction of arrow 1707.

Line 1706 has edges 1708 and 1710. Edges 1708 and 1710 are substantially parallel to each other.

As can be seen in this illustrative example, gap 1426 may become wider at distances farther away from location 1712. This increase in the size of gap 1426 may occur because of the curved shape of first flange 1418 for first disk 1415 and second flange 1422 for second disk 1416.

As gap 1426 increases in size away from location 1712, paint 1702 may not be deposited onto surface 1704 with as even of a thickness from edge 1708 to edge 1710. Although edges 1708 and 1710 may still be substantially parallel for line 1706, the thickness of paint 1702 sprayed onto surface 1704 may be thicker towards center line 1714 than towards edges 1708 and 1710. The thickness may be controlled by controlling the size of perimeter 1700. Perimeter 1700 for spray 1600 of paint 1702 may be selected such that gap 1426 is substantially the same width along center line 1714 within perimeter 1700.

Figure 18:
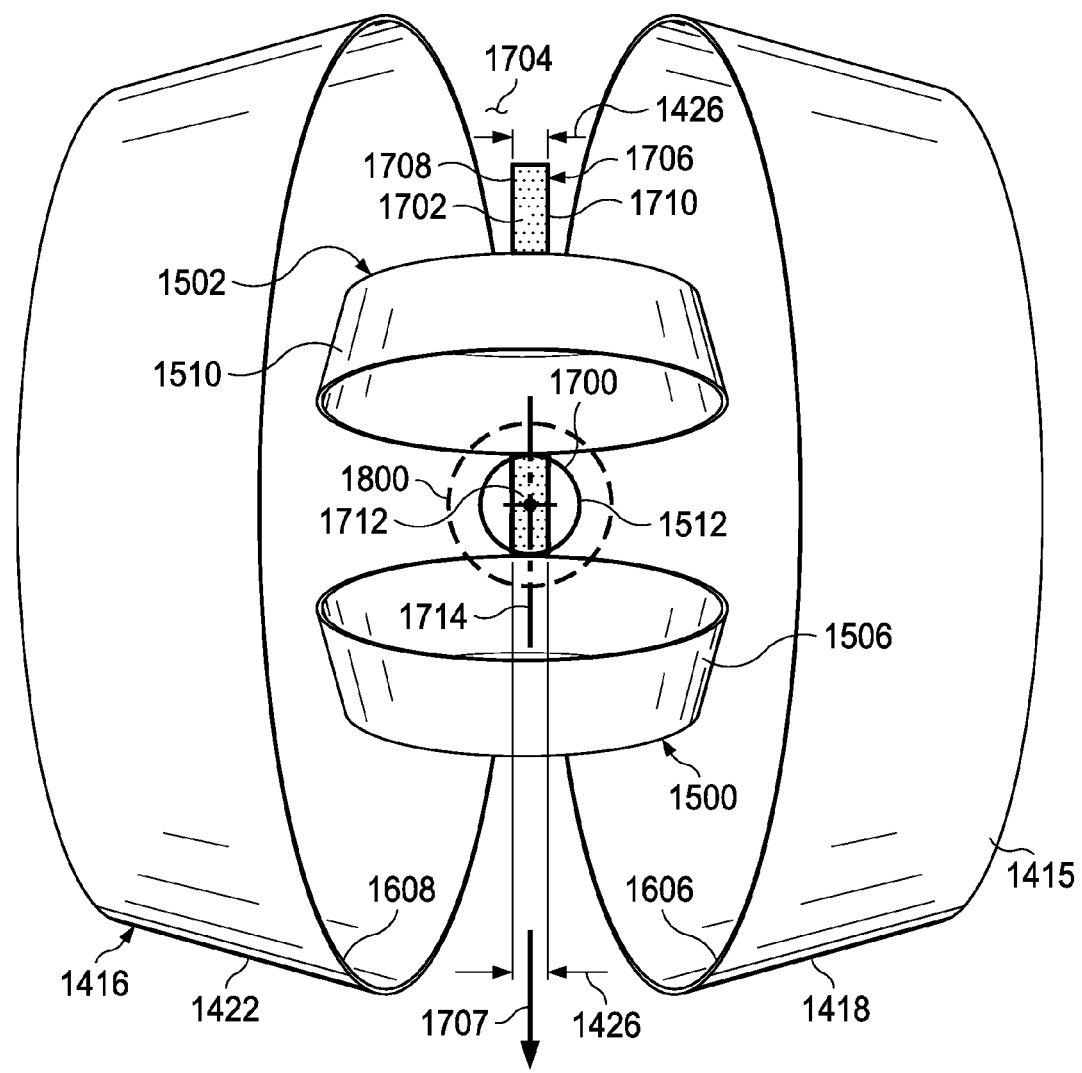
FIG. 18 is an illustration of a slot defined by a paint containment system in accordance with an illustrative embodiment.

With reference now to FIG. 18, an illustration of a slot defined by a paint containment system is depicted in accordance with an illustrative embodiment. In this illustrative example, third disk 1500 and fourth disk 1502 are used to maintain a desired width for gap 1426 within slot 1512 as defined by first disk 1415, second disk 1416, third disk 1500, and fourth disk 1502.

Third disk 1500 and fourth disk 1502 may limit the distance away from location 1712 through which paint 1702 may be sprayed. For example, if perimeter 1800 is present for spray 1600 of paint 1702, an uneven application of paint 1702 may be reduced by third disk 1500 and fourth disk 1502, limiting the width for slot 1512 to being substantially the same along center line 1714. Without third disk 1500 and fourth disk 1502, gap 1426 may widen along center line 1714 away from location 1712. This widening of gap 1426 may result in an uneven application of paint 1702 in painting line 1706.

In this manner, tool 1200 in FIG. 12 may be used to apply finishing compounds to a surface of an object without placing tape or other structures on the surface of the object. When tool 1200 does not need to contact the surface of the object, a second finishing compound may be placed over a first finishing compound in a desired manner. For example, a line of paint may be painted over a coat of primer on the surface of the object without using tape to define the line. Further, the line of paint may be painted before the primer has dried. In these illustrative examples, the primer may only need to dry sufficiently that the paint for the line does not diffuse or bleed in a manner that does not result in desired edges for the line of paint.

In this manner, the amount of time needed to apply finishing compounds may be reduced. In particular, time may be saved by avoiding time needed to place tape onto the surface of an object. Time is also saved, because the time for other finishing compounds to dry may be reduced since tape is not needed to apply additional finishing compounds. This reduction in the time needed to apply finishing compounds may reduce the time needed to complete manufacturing of the object.

The illustration of tool 1200 in FIGS. 12-18 are not meant to limit the manner in which different illustrative embodiments may be implemented. For example, in some implementations, tool 1200 may omit third disk 1500 and fourth disk 1502. In other illustrative examples, liquid remover system 1520 may comprise a vacuum system in addition to and/or in place of the reservoirs. In another illustrative example, electric motors may be used in addition to or in place of pneumatic motors for the movement system that rotate the disks in tool 1200.

The different components shown in FIGS. 12-18 may be combined with components in FIGS. 10 and 11, used with components in FIGS. 10 and 11, or a combination of the two. Additionally, some of the components in FIGS. 12-18 may be illustrative examples of how components shown in block form in FIGS. 10 and 11 can be implemented as physical structures.

Figure 19:
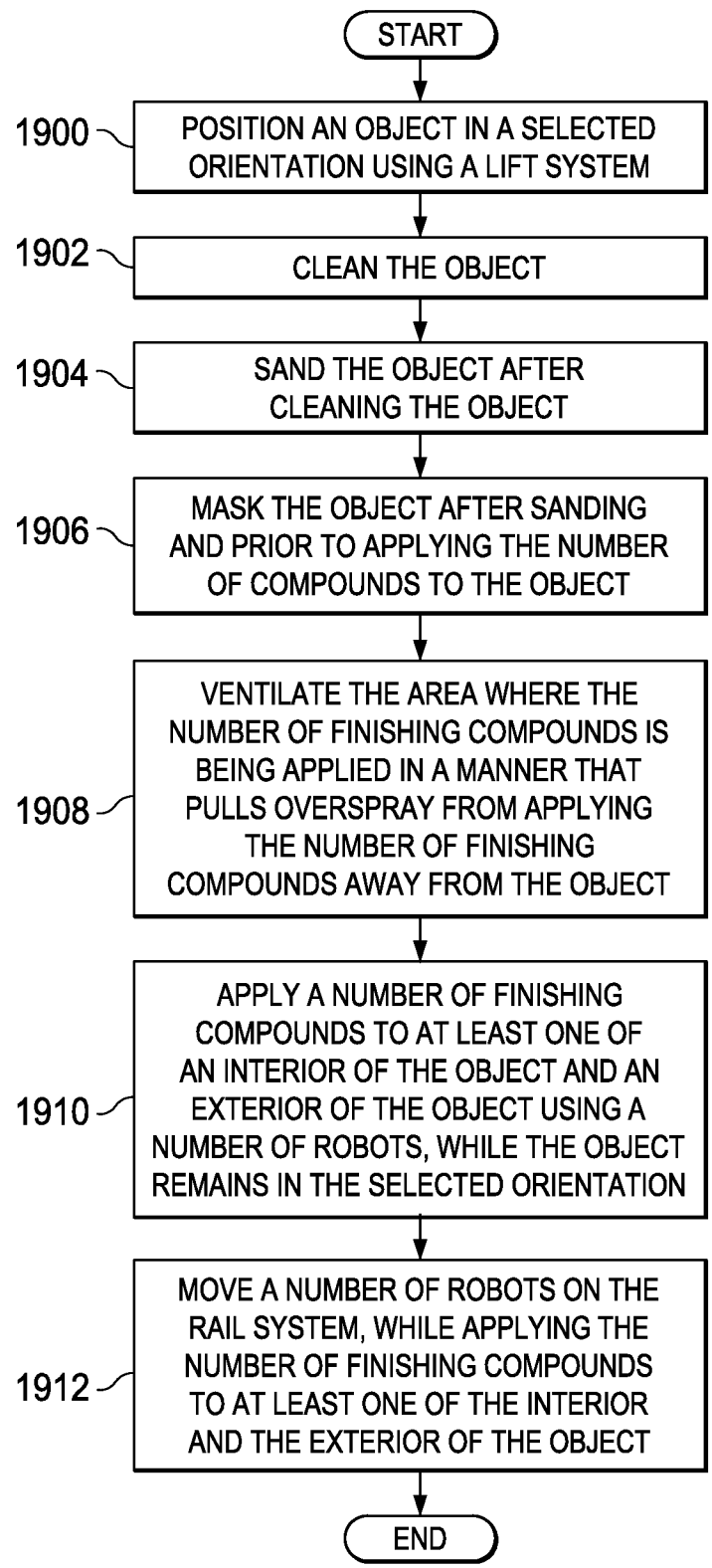
FIG. 19 is a flowchart of a process for processing an object in accordance with an illustrative embodiment.

Turning now to FIG. 19, a flowchart of a process for processing a wing is depicted in accordance with an illustrative embodiment. The process illustrated in FIG. 19 may be implemented in a finishing environment, such as, for example, finishing environment 300 in FIG. 3.

The process begins by positioning an object in a selected orientation using a lift system (operation 1900). In these examples, the object may be any suitable object. For example, without limitation, the object may be a wing, an engine cowling, a fuselage, a rudder, a barrel, a tank, or some other suitable object. The selected orientation may be, for example, a substantially horizontal orientation, a substantially vertical orientation, or some other suitable orientation for applying finishing compounds and/or performing finishing operations. The substantially horizontal position may be a position slightly tilted from a true horizontal position to allow maximum water drainage.

The process then cleans the object (operation 1902). This cleaning may include using water and/or other solutions to prepare the object for finishing. The process then sands the object after cleaning the object (operation 1904). Next, the object is masked after sanding and prior to applying the number of compounds to the object (operation 1906). The process ventilates the area where the number of finishing compounds is being applied in a manner that pulls overspray from applying the number of finishing compounds away from the object (operation 1908).

Thereafter, a number of finishing compounds are applied to at least one of an interior of the object and an exterior of the object using a number of robots, while the object remains in the selected orientation (operation 1910).

In operation 1910, the applying operations may include applying a first finishing compound in the number of finishing compounds to the interior of the object and applying a second finishing compound in the number of finishing compounds to the exterior of the object, while the first finishing compound is curing. Of course, other combinations of finishing compounds and sequences of applications may be performed, depending on the particular implementation.

The process moves a number of robots on the rail system, while applying the number of finishing compounds to at least one of the interior and the exterior of the object (operation 1912), with the process terminating thereafter.

Figure 20:
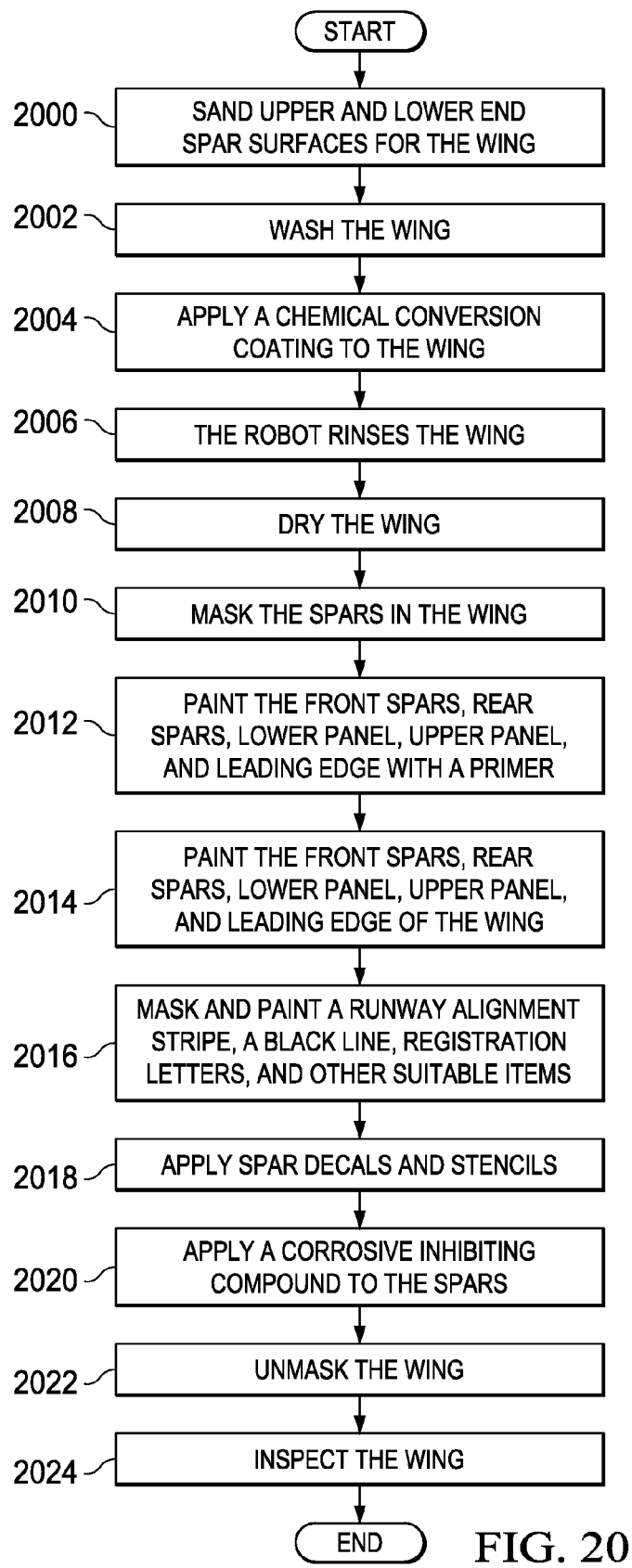
FIG. 20 is a flowchart of a process for finishing a wing in accordance with an illustrative embodiment.

Turning now to FIG. 20, a more-detailed flowchart of a process for finishing a wing is depicted in accordance with an illustrative embodiment. The process illustrated in FIG. 20 may be implemented in a finishing environment, such as, for example, finishing environment 300, using automated finishing system 302 in FIG. 3.

The process begins by sanding upper and lower end spar surfaces for the wing (operation 2000). These sanding operations may be performed by human operators and/or robots. Thereafter, the wing is washed (operation 2002). A chemical conversion coating is applied to the wing (operation 2004). This chemical conversion coating is applied to improve paint and sealant adhesion and to provide more corrosion protection. The chemical conversion coating may be, for example, alodine, an anodizing process, or some other suitable chemical conversion coating. Thereafter, the wing is rinsed by the robot (operation 2006).

The process then dries the wing (operation 2008). This operation also may be performed using robots blowing air on the wing with an appropriate tool.

Next, spars in the wing are masked (operation 2010). This masking may be performed by human operators and, in some implementations, by robots.

The process then paints the front spars, rear spars, lower panel, upper panel, and leading edge with a primer (operation 2012). One or more of these items painted in operation 2012 may be painted substantially in parallel by the robots on one or more wings at the same time.

The robots then paint the front spars, rear spars, lower panel, upper panel, and leading edge of the wing (operation 2014). One or more of these different locations may be painted simultaneously in operation 2014. The leading edge in operation 2014 may be painted with a synthetic fluoropolymer, such as polytetrafluoroethene. For example, the paint for the leading edge may use Teflon fluoropolymer resin paint, which may be available from DuPont.

The process then masks and paints a runway alignment stripe, a black line, registration letters, and other suitable items (operation 2016). The masking may be performed by human operators or by robots. The painting, in these examples, is performed by robots to obtain a more even thickness of the paint coat as compared to using human operators. The process then applies spar decals and stencils (operation 2018). Spar decals are placards that may be applied near valves, switches, and/or other electrical devices. These spar decals identify maintenance and/or operator instructions. Stencils are words, phrases, lines, measurement points, and/or other references that may be painted on the wing.

Next, a corrosive inhibiting compound is applied to the spars (operation 2020). A corrosive inhibiting compound may take various forms. For example, without limitation, a corrosive inhibiting compound may be paint, foam, an anodic inhibitor, a cathodic inhibitor, and/or some other suitable type of compound. The wing is then unmasked (operation 2022). The wing is then inspected (operation 2024), with the process terminating thereafter.

Figure 21:
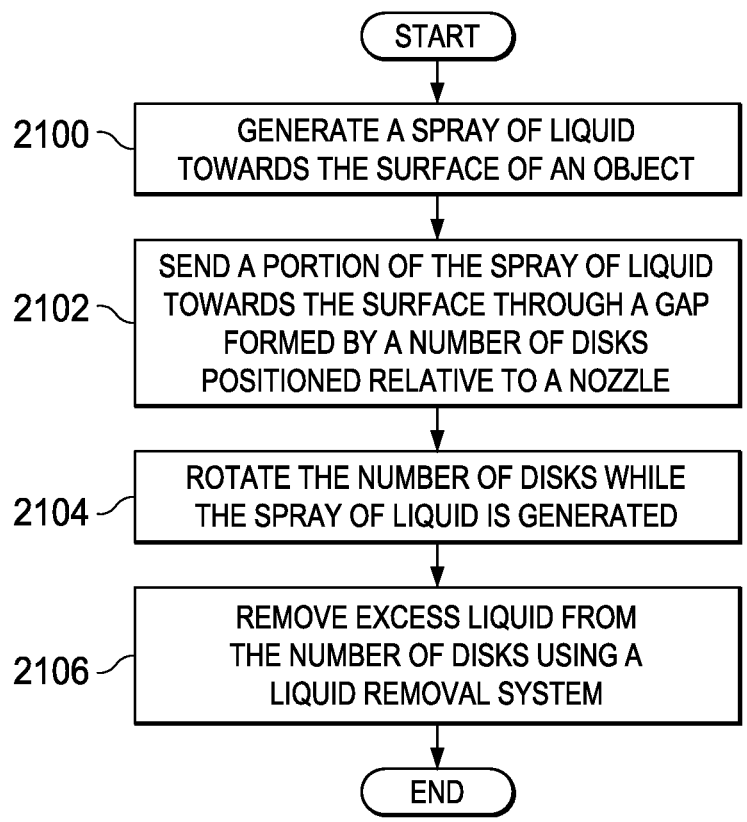
FIG. 21 is a flowchart of a process for spraying liquid on a surface of an object in accordance with an illustrative embodiment.

With reference now to FIG. 21, a flowchart of a process for spraying liquid on a surface of an object is depicted in accordance with an illustrative embodiment. The process illustrated in FIG. 21 may be implemented using a tool, such as tool 1000 in FIG. 10.

The process begins by generating a spray of liquid towards the surface of the object (operation 2100). The process sends a portion of the spray of liquid towards the surface through a gap formed by a number of disks positioned relative to a nozzle (operation 2102). The process rotates the number of disks while the spray of liquid is generated (operation 2104). In these illustrative examples, the interior surface of the disks is configured to block a portion of the spray of liquid from reaching the surface of the object.

The process removes excess liquid from the number of disks using a liquid removal system (operation 2106), with the process terminating thereafter.

The flowcharts and block diagrams in the different depicted embodiments illustrate the architecture, functionality, and operation of some possible implementations of apparatuses and methods in different illustrative embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a method and apparatus for finishing an object. In the illustrative examples, the object takes the form of a wing. The different illustrative embodiments provide a capability to reduce the time and expense needed to finish an object, such as a wing. In the different illustrative embodiments, increased accuracy and reliability with respect to painting a wing may be present through the use of robots using spray guns to apply different types of finishing compounds. These finishing compounds may include, for example, water, paint, corrosion inhibiting compounds, and/or other components.

With the different illustrative embodiments, a more consistent thickness of paint may be applied as compared to currently used techniques in which human operators apply paint to the wing. Further, time may be reduced to finish a wing with a capability to perform various finishing operations simultaneously, as opposed to sequentially with currently available processes.

For example, the time needed to finish a wing may be reduced from about five days using currently available processes and finishing environments to about 36 hours using one or more of the different illustrative embodiments.

Further, weight savings may be achieved through more uniform and controlled paint thicknesses that may be provided using robots as opposed to human operators with currently used processes. In other words, the thickness of the applied paint may be controlled to a higher degree with the use of robots for painting than with a manual paint process. These weight savings in an aircraft may be substantial weight savings for a wing, depending on the particular implementation.

Additionally, the different illustrative embodiments may require less space because only a single booth or area is required for a wing as opposed to three booths with other types of processes. In addition, the amount of paint that may be wasted and materials for masking also may be reduced using the different illustrative embodiments.

Further, the different illustrative embodiments may provide for a more efficient use of space. In the different illustrative examples, each finishing area may be used to perform all of the different finishing operations. As a result, a wing may be completely finished within a particular finishing area without requiring movement to another finishing area. Further, a reduction in the use of cranes to lift and move wings may be reduced by about over 80 percent as compared to currently used finishing processes and systems.

The different illustrative embodiments also may reduce the number of cures, masking operations, and spraying or application operations. As a result, reduced energy use, reduced use of perishable tools, and reduced chemical waste may be realized using one or more of the different illustrative embodiments.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments.

Although the different illustrative embodiments have been described with respect to parts for an aircraft, other illustrative embodiments may be applied to parts for other types of objects. For example, without limitation, other illustrative embodiments may be applied to parts for a mobile platform, a stationary platform, a land-based structure, an aquatic-based structure, a space-based structure, and/or some other suitable object.

More specifically, the different illustrative embodiments may be applied to, for example, without limitation, parts for a submarine, a bus, a personnel carrier, a tank, a train, an automobile, a spacecraft, a space station, a satellite, a surface ship, a power plant, a dam, a manufacturing facility, a building, and/or some other suitable object.

The embodiment or embodiments selected are chosen and described in order to best explain the principles of the embodiments and the practical application, and to enable others of ordinary skill in the art to understand the disclosure for various embodiments with various modifications as are suited to the particular use contemplated.

What is claimed is:

1. An apparatus comprising:
   a nozzle configured to generate a spray of a liquid towards a surface; and
   a number of disks positioned relative to the nozzle and configured to form a gap through which a portion of the spray of the liquid passes towards the surface.

2. The apparatus of claim 1, wherein the number of disks comprises:
   a first disk having a first flange around a first edge of the first disk; and
   a second disk having a second flange around a second edge of the second disk, wherein the first flange and the second flange form the gap.

3. The apparatus of claim 2, wherein the first disk and the second disk are configured to rotate while the nozzle generates the spray of the liquid.

4. The apparatus of claim 2, wherein the spray of the liquid has a spray axis extending through the nozzle and wherein the first disk is positioned at a first angle to the spray axis and the second disk is positioned at a second angle to the spray axis.

5. The apparatus of claim 2, wherein the number of disks further comprises:

a third disk having a third flange around a third edge of the third disk; and a fourth disk having a fourth flange around a fourth edge of the fourth disk.

6. The apparatus of claim 1 further comprising:

a movement system configured to rotate the number of disks.

7. The apparatus of claim 1 further comprising:

a liquid remover system positioned relative to the number of disks, wherein the liquid remover system is configured to remove the liquid from the number of disks.

8. The apparatus of claim 7, wherein the liquid remover system comprises at least one of a scraper and a vacuum system.

9. The apparatus of claim 7, wherein the liquid remover system comprises:

a collection structure configured to hold the liquid removed from the number of disks by the liquid remover system.

10. The apparatus of claim 1 further comprising:

a housing, wherein the nozzle and the number of disks are associated with the housing, and the housing, the nozzle, and the number of disks form a tool.

11. The apparatus of claim 10 further comprising:

a robot, wherein the tool is configured to be connected to an end effector on an arm of the robot.

12. The apparatus of claim 11 further comprising:

a lift system capable of positioning an object in a selected orientation; and a number of robots including the robot, wherein the number of robots is capable of applying a number of finishing compounds to at least one of an interior of the object and an exterior of the object, while the object remains in the selected orientation.

13. The apparatus of claim 1, wherein the liquid is selected from one of a number of finishing compounds, a top coat paint, a waxy oil, paint, an adhesive, a lubricant, a primer, and a sealant.

14. The apparatus of claim 1, wherein the surface is for an object selected from one of a wing, an engine cowling, a fuselage, a rudder, a barrel, and a tank.

15. A method for spraying a liquid onto a surface, the method comprising:

generating a spray of the liquid from a nozzle towards the surface; and sending a portion of the spray of the liquid towards the surface through a gap formed by a number of disks positioned relative to the nozzle.

16. The method of claim 15 further comprising:

removing blocked liquid from the number of disks.

17. The method of claim 15 further comprising:

rotating the number of disks while the spray of the liquid is directed towards the surface.

18. The method of claim 15, wherein the number of disks comprises a first disk having a first flange around a first edge of the first disk and a second disk having a second flange around a second edge of the second disk, wherein the first flange and the second flange form the gap.

19. The method of claim 18, wherein the number of disks further comprises a third disk having a third flange around a third edge of the third disk and a fourth disk having a fourth flange around a fourth edge of the fourth disk, wherein the first flange, the second flange, the third flange, and the fourth flange form the gap in a form of a slot.

20. The method of claim 15, wherein the liquid is selected from one of a number of finishing compounds, a top coat paint, a waxy oil, paint, an adhesive, a lubricant, a primer, and a sealant.

\* \* \* \* \*